(12) United States Patent
Singhal

(10) Patent No.: US 10,250,288 B2
(45) Date of Patent: Apr. 2, 2019

(54) APPARATUS AND METHOD FOR A HAND WEARABLE ELECTRONIC DEVICE

(71) Applicant: Tara Chand Singhal, Torrance, CA (US)

(72) Inventor: Tara Chand Singhal, Torrance, CA (US)

(*) Notice: Subject to any disclaimer, the term of this patent is extended or adjusted under 35 U.S.C. 154(b) by 174 days.

(21) Appl. No.: 14/515,522

(22) Filed: Oct. 16, 2014

(65) Prior Publication Data

US 2015/0341068 A1     Nov. 26, 2015

Related U.S. Application Data

(60) Provisional application No. 62/038,090, filed on Aug. 15, 2014, provisional application No. 62/021,186, filed on Jul. 6, 2014, provisional application No. 62/019,496, filed on Jul. 1, 2014, provisional application No. 62/015,435, filed on Jun. 21, 2014, provisional application No. 62/012,414, filed on Jun. 15, 2014, provisional application No. 62/006,264, filed on Jun. 2, 2014, provisional application No. 62/002,236, filed on May 23, 2014.

(51) Int. Cl.
*H05K 7/02* (2006.01)
*H04B 1/3827* (2015.01)
*G06F 1/16* (2006.01)
*H04B 1/3888* (2015.01)
*H04M 1/04* (2006.01)

(52) U.S. Cl.
CPC ............ *H04B 1/385* (2013.01); *G06F 1/163* (2013.01); *H04B 1/3888* (2013.01); *H04B 2001/3861* (2013.01); *H04M 1/04* (2013.01)

(58) Field of Classification Search
None
See application file for complete search history.

(56) References Cited

U.S. PATENT DOCUMENTS

| | | | |
|---|---|---|---|
| 1,294,938 A | 2/1919 | Mullen | |
| 5,766,131 A * | 6/1998 | Kondo | A61B 5/02416 600/310 |
| 6,519,207 B1 | 2/2003 | Lukacsko | |
| 7,334,711 B1 * | 2/2008 | Winters | A45F 5/00 224/217 |
| 7,959,351 B1 * | 6/2011 | Thorpe | A41D 19/0027 224/164 |
| 8,191,210 B2 * | 6/2012 | Devers | A44C 5/0053 224/170 |

(Continued)

OTHER PUBLICATIONS

Freehand: Convenient Hand Storage on the Back of Your Hand, www.cellphones.ca/news/post002244/, 2 pages.

(Continued)

*Primary Examiner* — Sunit Pandya
(74) *Attorney, Agent, or Firm* — Steve Roeder, Esq.

(57) ABSTRACT

A hand wearable electronic device uses a space on a backside of a human hand, between the wrist joint and the finger joints, the space referred to as opisthenar, has mounted or worn thereon a wear mechanism for an electronic device. The device has functions of (i) receive/transmit RF electronics, (ii) a touch/display screen, (iii) a battery, and (iv) external switches; and a logic in the device that provides for the device use as an extension device for use with a smart phone.

24 Claims, 33 Drawing Sheets device on harness

(56) References Cited

U.S. PATENT DOCUMENTS

| | | | | |
|---|---|---|---|---|
| 8,328,055 B1 * | 12/2012 | Snyder | | A45F 5/00 224/197 |
| 8,725,842 B1 * | 5/2014 | Al-Nasser | | G04G 17/08 709/219 |
| 8,851,372 B2 * | 10/2014 | Zhou | | G06F 1/163 235/380 |
| 9,563,234 B2 * | 2/2017 | Popalis | | G06F 1/163 |
| 2001/0017663 A1 * | 8/2001 | Yamaguchi | | H04N 1/00249 348/373 |
| 2004/0057578 A1 * | 3/2004 | Brewer | | G04G 21/04 379/433.1 |
| 2005/0205622 A1 | 9/2005 | Liu | | |
| 2008/0054039 A1 * | 3/2008 | Wulff | | A45F 5/00 224/575 |
| 2010/0177604 A1 * | 7/2010 | Ginter | | A44C 5/0015 368/282 |
| 2012/0217275 A1 | 8/2012 | Yu | | |
| 2012/0322587 A1 * | 12/2012 | Duke | | A63B 69/0071 473/450 |
| 2014/0084035 A1 | 3/2014 | Georges | | |
| 2014/0160078 A1 * | 6/2014 | Seo | | G06F 3/017 345/175 |
| 2015/0015502 A1 * | 1/2015 | Al-Nasser | | G04G 17/08 345/173 |
| 2016/0157372 A1 * | 6/2016 | Hiroki | | G06F 1/163 361/748 |

OTHER PUBLICATIONS

Exotic iPhone: bracelet and signet, Mar. 26, 2014, 5 pages, http://skinthemoon.wordpress.com/2014/03/26/exotic-iphone-bracelet-and-signet/.

Another Wearable Call PHone Concept, Jul. 12, 2008, 1 page, http://textually.org/textually/archives/2008/07/020728.htm.

Puddy—Pocket Buddy, Apr. 26, 2011, 3 pages, http://projectxf.blogspot.com/2011/04/puddy-pocket-buddy.html.

Gloveone Brings the 'Call Me' Hand Symbol Full Circle, May 16, 2012, 7 pages, http://newrisingmedia.com/all/2012/5/16/gloveone-brings-the-call-me-hand-symbol-full-c . . .

* cited by examiner

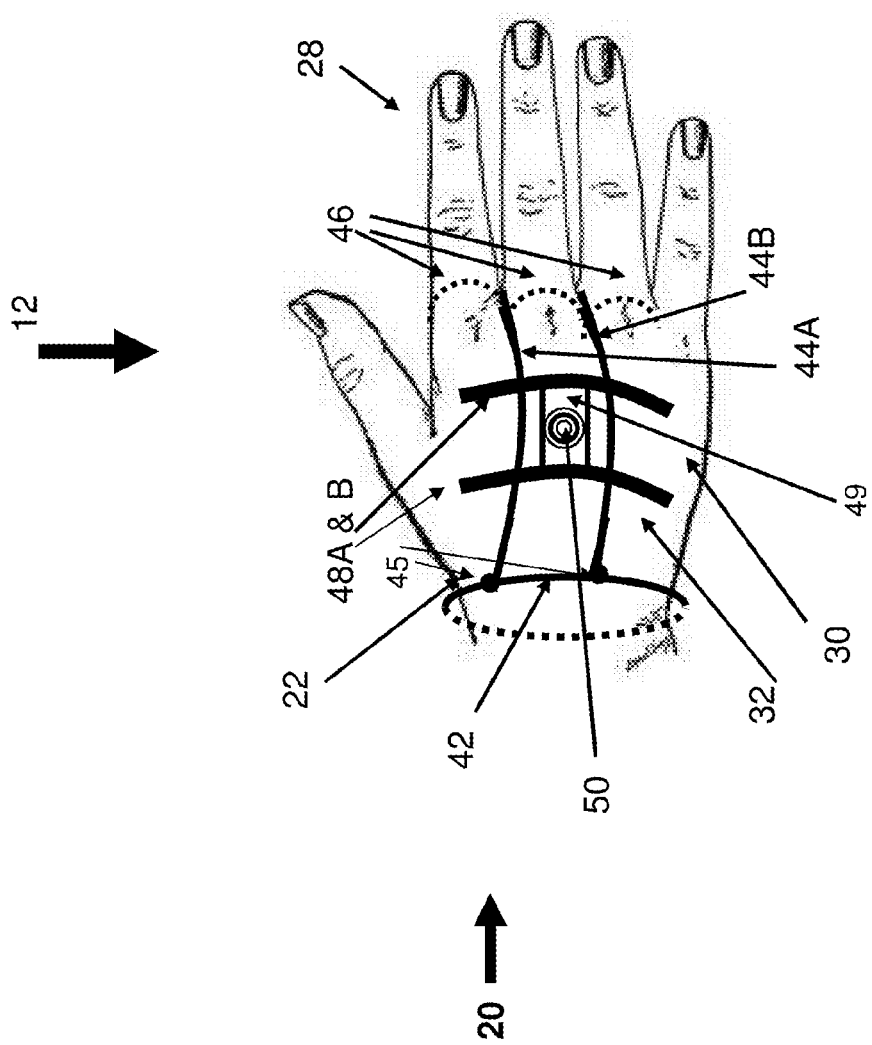
Figure 2A - harness

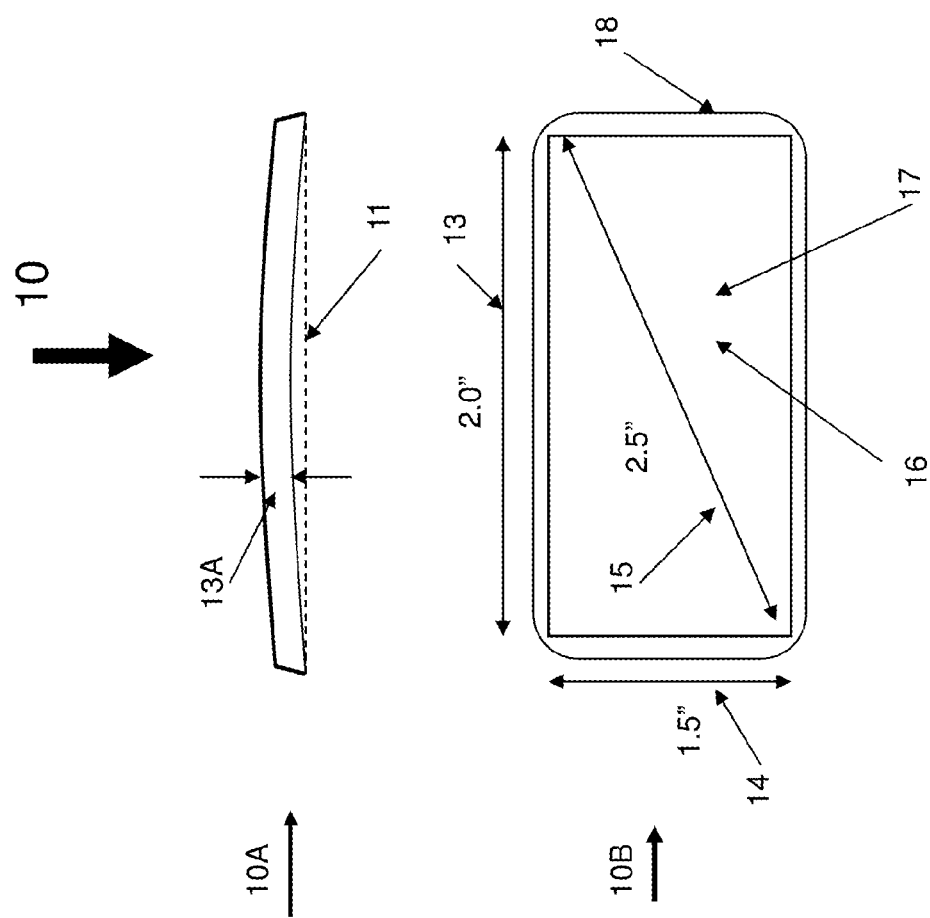

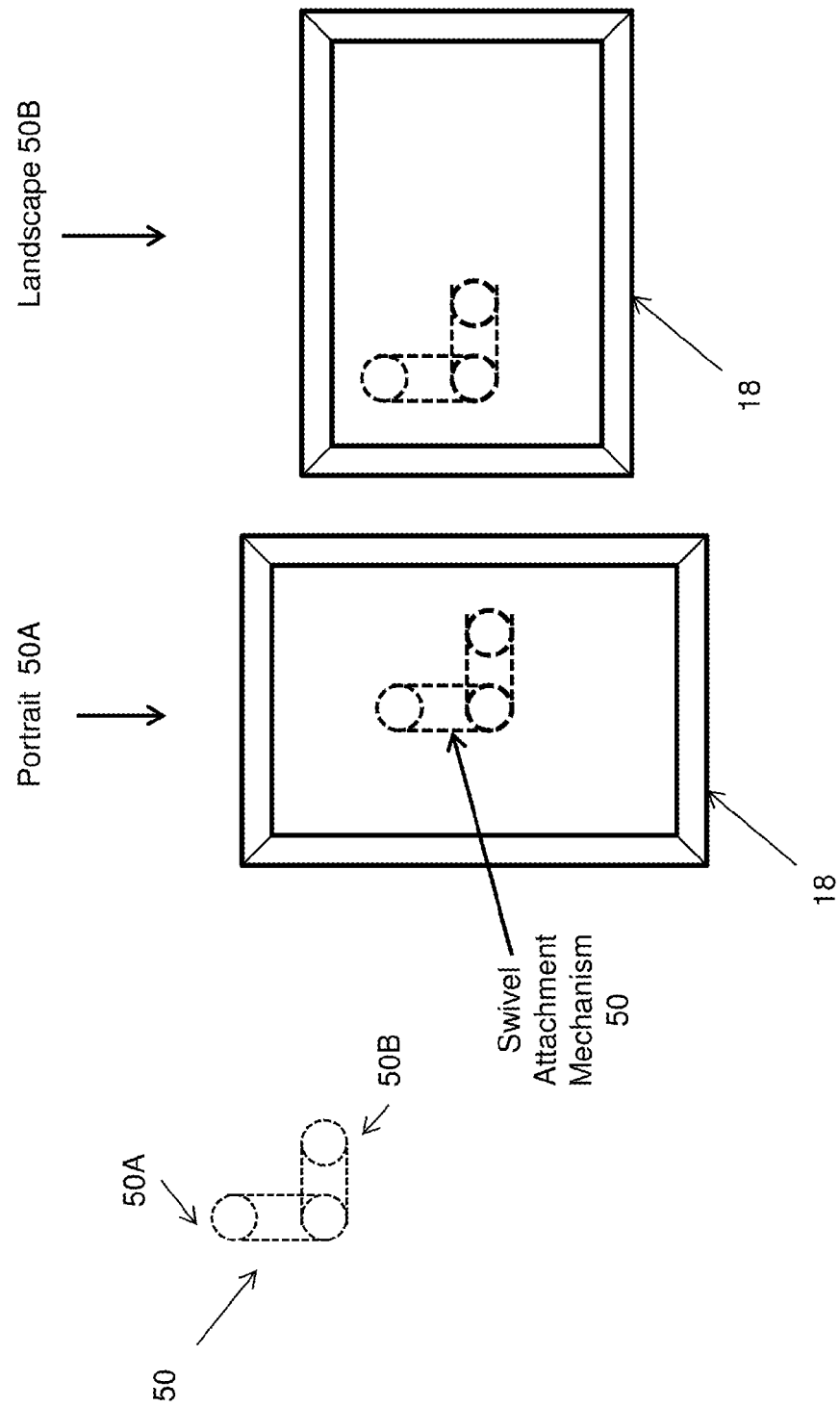

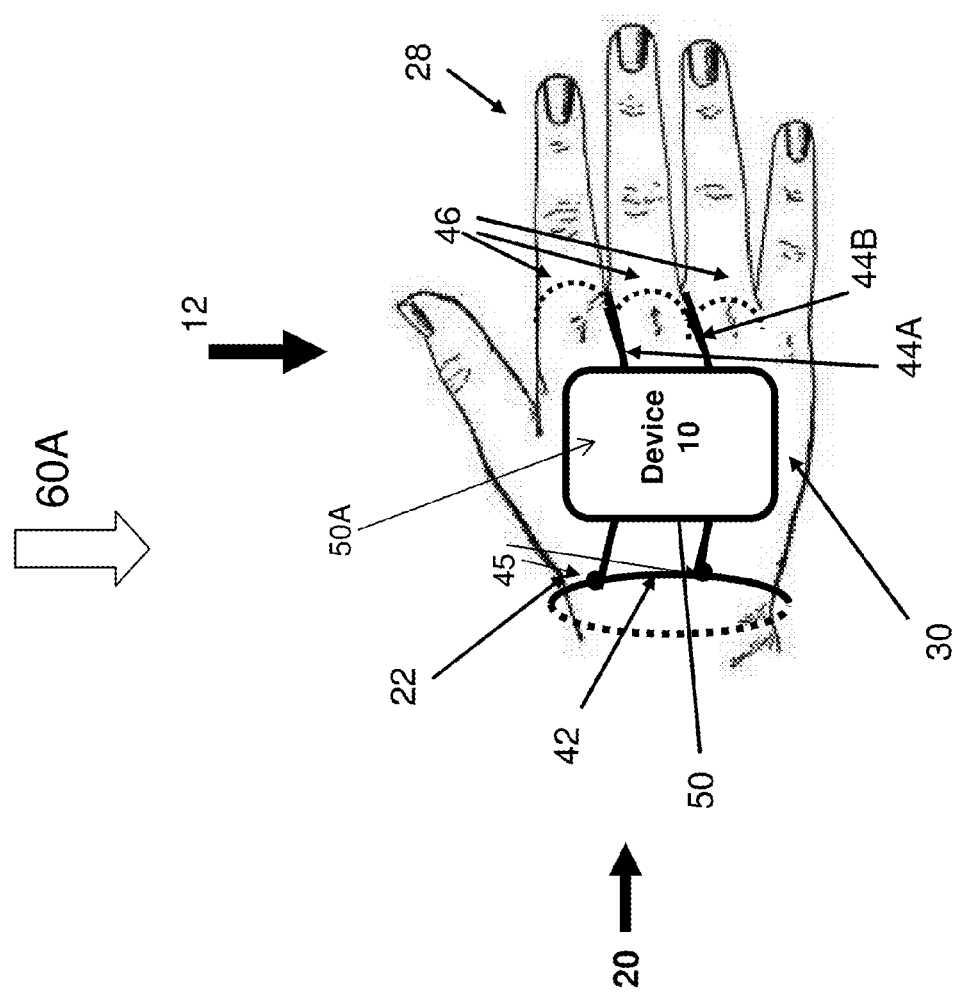
Figure 3A – device on harness

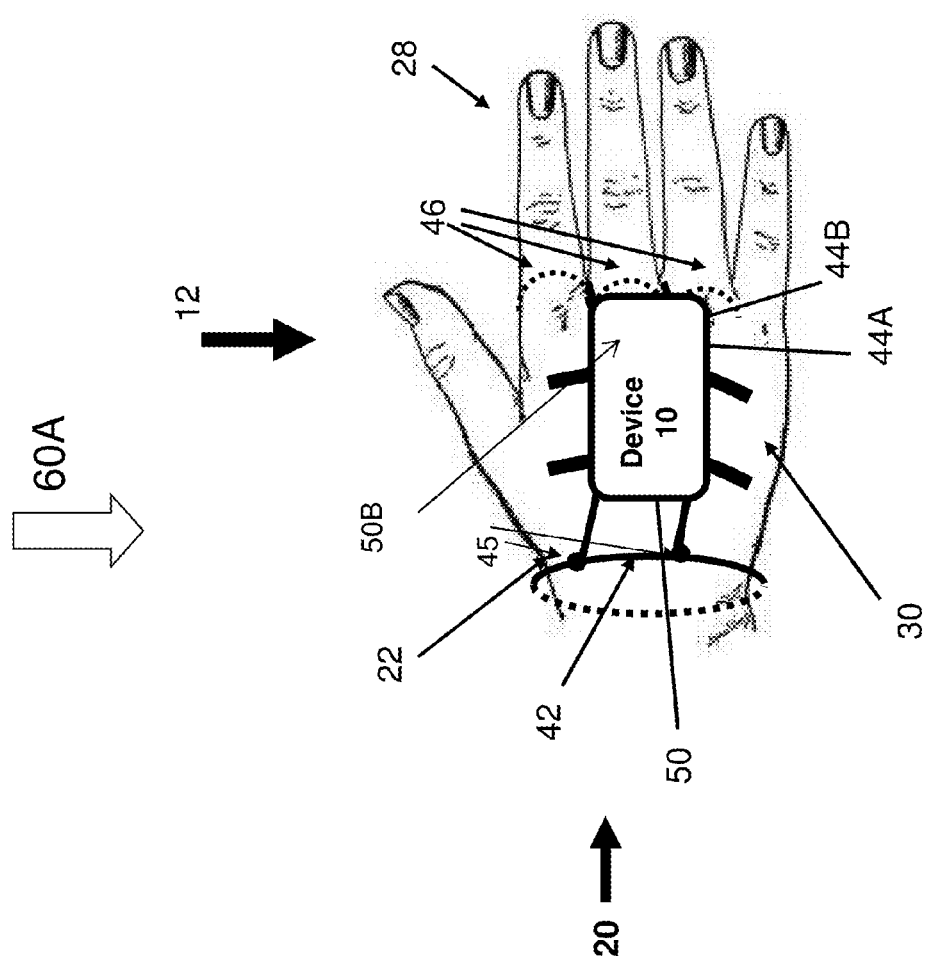
Figure 3B – device on harness

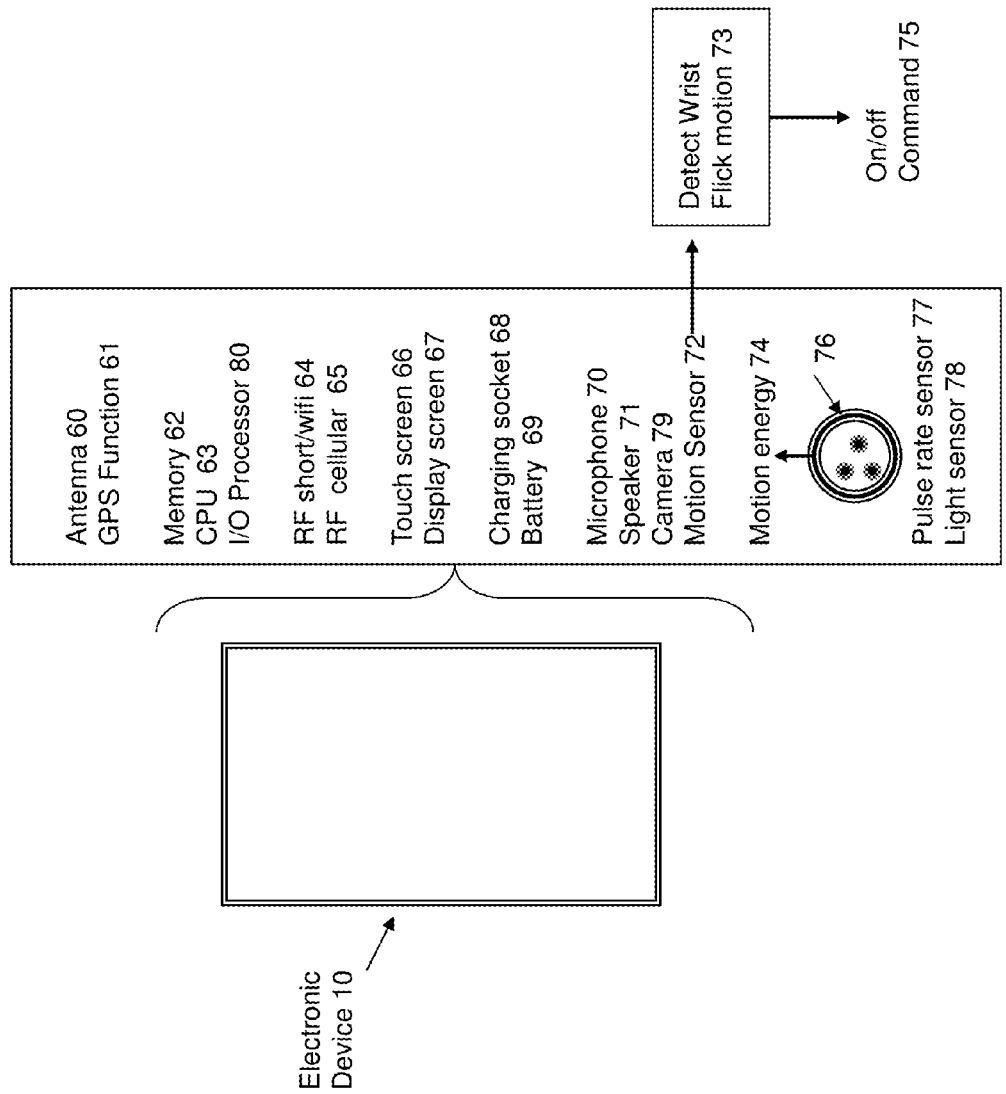

Device 10 Functions 80

Logic has

RF – rcv-txmt to smart phone/auto 82

Touch/display screen 84

Motion sensor 86

Wrist Flick motion control on/off/mode 88

Wrist movement energy generation 90

Battery 92

External switches 94

Microphone 96

Speakers 98

Figure 8B

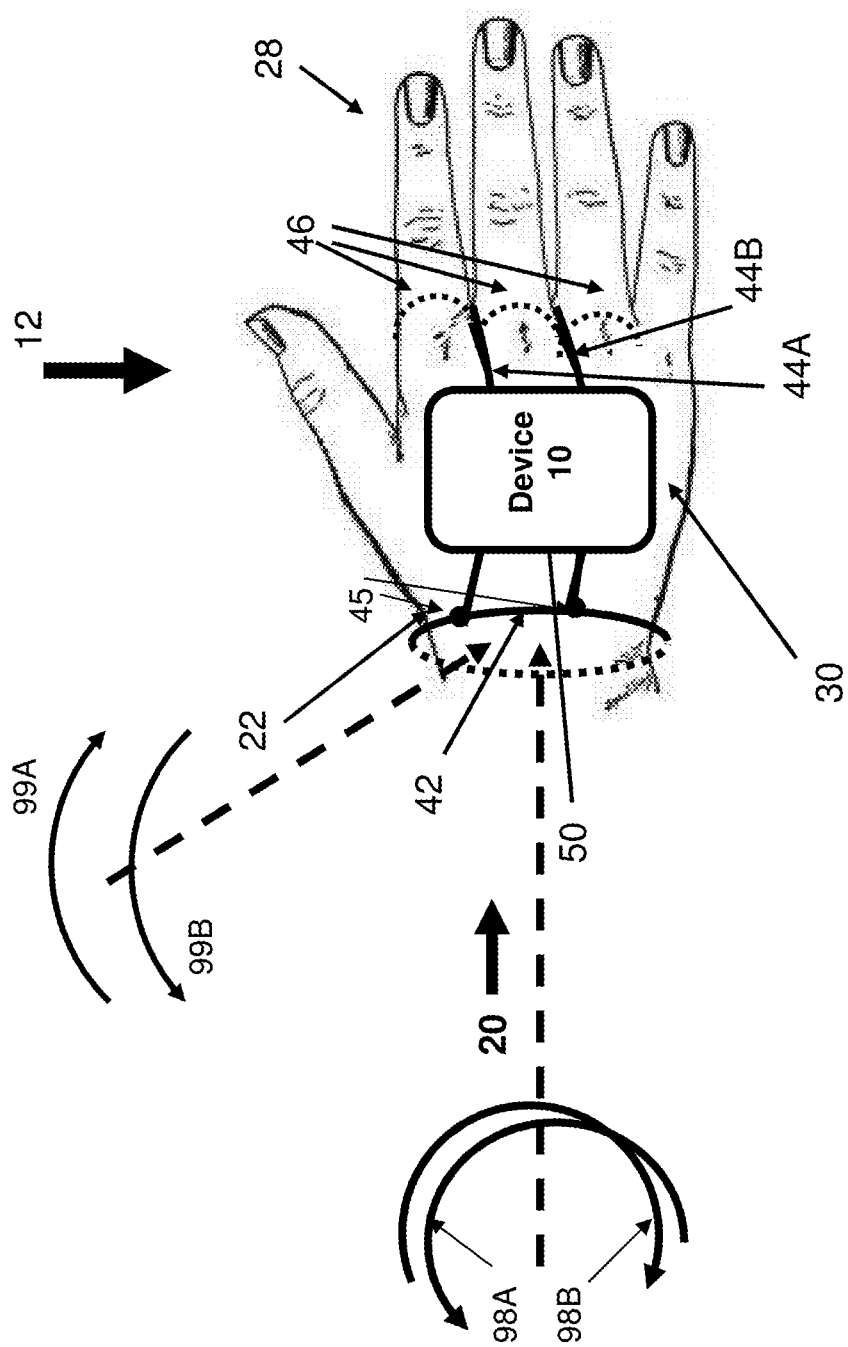
Figure 9A – motion control

At step 100, using a space on a back-side of a human hand, between the wrist joint and the finger joints, the space referred to as *opisthenar*, mounting or wearing thereon a wear mechanism for an electronic device;

At step 102, providing in the device functions of (i) receive/transmit RF electronics, (ii) a touch/display screen, (iii) a battery, and (iv) external switches; and At step 104, providing in the device logic functions that for using the device as an extension device for a smart phone.

At step 106, providing a motion sensor, coupling the sensor with a logic that provides wrist-hand flick activated device on/off control and mode control functions.

At step 108, providing a wrist-hand movement motion generated electric energy generation mechanism.

At step 110, having a loop around a wrist joint and attached to a portion of the loop, first ends of a pair of linear members terminating in a half loop hook on the second ends, the hooks support the linear members in the joint between fingers;

At step 112, having a pair of cross members positioned across the linear members and attached to the linear members, the members providing a support and mounting mechanism for positioning an electronic device;

At step 114, using the wear mechanism used for mounting the electronic device with the device detachably attached to the cross members.

At step 116, the wear mechanism positioned on *opisthenar* clear of the wrist joint and its motion and also clear of the finger joints and their motions;

At step 118, enabling a mechanism enabling mounting the device that is similarly positioned away from the wrist joint and finger joints and their movements.

Figure 11

Initialize 208
Accelerometer Data output: 202
>> Detect swing begin (3 sec motion pause)
  - Collect 3D coordinates data
>> Detect swing data ( 1 – 2 sec)
  - collect 3D coordinate data every 1/10$^{th}$ sec
>> Detect swing end (3 sec motion pause)
  - Collect 3D Coordinates data

Swing Analysis Logic 200
>> Create Meta data
  (time, date, club id, swing sequence id, Swing id)
>> Store Data
>> Compute swing data every 1/20 second
  - time, coordinates, xyz velocity, xyz acceleration
>> Display Data

Figure 13B

Bio feedback function 500

1. Launch Biofeedback app
2. Display Biofeedback screen 500A
3. Detect Launch activation
4. Display Screen 500B
5. Display current pulse rate
6. Begin Time Counter
7. Display pulse rate
8. Store pulse rate data
9. Chime note when desired pulse rate reached
10. Display elapsed time
11. Compare with previous elapsed times

FIGURE 15B

APPARATUS AND METHOD FOR A HAND WEARABLE ELECTRONIC DEVICE

CROSS REFERENCE

This application claims priority from provisional patent application Ser. No. 62/002,236, filed May 23, 2014, and titled "APPARATUS AND METHOD FOR A HAND WEARABLE ELECTRONIC DEVICE" of Tara Chand Singhal. The contents of application Ser. No. 62/002,236 are incorporated herein by reference.

This application claims priority from provisional patent application Ser. No. 62/006,264, filed Jun. 1, 2014, and titled "APPARATUS AND METHOD FOR A HAND WEARABLE ELECTRONIC DEVICE" of Tara Chand Singhal. The contents of application Ser. No. 62/006,264 are incorporated herein by reference.

This application claims priority from provisional patent application Ser. No. 62/012,414, filed Jun. 15, 2014, and titled "APPARATUS AND METHOD FOR A HAND WEARABLE ELECTRONIC DEVICE" of Tara Chand Singhal. The contents of application Ser. No. 62/012,414 are incorporated herein by reference.

This application claims priority from provisional patent application Ser. No. 62/015,435, filed Jun. 21, 2014, and titled "APPARATUS AND METHOD FOR A HAND WEARABLE ELECTRONIC DEVICE" of Tara Chand Singhal. The contents of application Ser. No. 62/015,435 are incorporated herein by reference.

This application claims priority from provisional patent application Ser. No. 62/019,496, filed Jul. 1, 2014, and titled "APPARATUS AND METHOD FOR A HAND WEARABLE ELECTRONIC DEVICE" of Tara Chand Singhal. The contents of application Ser. No. 62/019,496 are incorporated herein by reference.

This application claims priority from provisional patent application Ser. No. 62/021,186, filed Jul. 6, 2014, and titled "APPARATUS AND METHOD FOR A HAND WEARABLE ELECTRONIC DEVICE" of Tara Chand Singhal. The contents of application Ser. No. 62/021,186 are incorporated herein by reference.

This application claims priority from provisional patent application Ser. No. 62/038,090, filed Aug. 15, 2014, and titled "APPARATUS AND METHOD FOR A HAND WEARABLE ELECTRONIC DEVICE" of Tara Chand Singhal. The contents of application Ser. No. 62/038,090 are incorporated herein by reference.

FIELD OF THE INVENTION

The embodiments herein relate to improvements in a wearable electronic device worn on the human body and specifically wearable on the back side of a human hand.

BACKGROUND

Recently there have been many news items as well as new products that are related to and characterized as wearable devices. Specifically there are products and news items related to a watch-type device that is worn on the wrist of a human hand.

An illustrative example of such a watch-type device is from Samsung branded as GEAR that is a device that is worn on the wrist of a human hand as one would wear a watch that displays time. These devices are micro-computers and have a screen for data display and with a short distance wireless interface, work as an extension device to a smart phone device. There are other similar products already in the market, believed to be in the development stage or planned for future development, including from Apple.

Hence, it is an objective of the embodiments herein to provide for better and/or improved human body-wearable electronic devices. It is another objective to provide these devices with other and different features that make them more user-friendly and versatile in their use and operation.

SUMMARY

The embodiments herein relate to improvements in human body-wearable electronic devices, and specifically for an electronic device that is worn on the back side of a human hand.

A human hand has the parts of fingers, palm, back of the hand. The back of the hand is also called opisthenar and is the back of the hand that shows the dorsal venous network, a web of veins. The wrist is the connection point between the arm and the hand and facilitates hand motion. The fingers include four fingers and a thumb and the palm is the part of the hand that along with the fingers and the thumb is used most for grabbing or holding things and for operating devices and machinery.

A watch that is worn on the wrist is a common prior art wearable device. A large segment of the electronic device industry is engaged in making and creating improvements in such a watch type device, specifically making such a watch type device do more functions other than showing time such as having a display screen for display of data.

Embodiments herein disclose a different type of hand wearable device that is worn on the back of the hand or worn on a part of the opisthenar using a wear-mechanism. There is substantially a flat trapezoidal shape area on the back of the human hand between the finger joints and the wrist joint that may be advantageously used to mount thereon or position thereon an electronic device with a display screen.

Such a device positioned or mounted on the back side of the hand has a touch/display screen and notionally in size may be 1.5 inch wide and 2 inch long or notionally with 2.5 inch diagonal screen. In other embodiments the size of the device may be larger then these sizes and may notionally be up to 3.5 inch diagonal in screen size, where such a size may extend over the finger knuckles.

It is believed such a hand wearable device has advantages over a watch-like device that is worn on the wrist. These advantages, it is believed are better user interface as well as user accessibility for use without affecting the use and operation of the human hand.

The device is worn on the back of the hand and thus the device is exposed to ambient light. In some embodiments, the device may be powered by solar energy using solar cells that are advantageously positioned on or near the device while it is worn on the back of the hand.

In some embodiments, conventional solar cells as had been used in solar powered calculators may be advantageously used. In other embodiments solar cells based on Charge Coupled Device (CCD) technology may be used as they may be more efficient than conventional solar cells.

The electronic device may have different applications that may include stand alone applications as well as applications that use short distance wireless and those that use other wireless technologies.

There may be more and many different applications that flow from the device being worn on the back of the human hand and these are not ruled out. These may include sports that use movement of body and or swing of a hand to throw. These sports may include baseball, golf, and jogging and others. In these applications, swing logic in the device with the help of a motion sensor may analyze swing dynamics.

The device may also have a pulse rate sensor that is integrated at the back-side of the device. The sensor can measure pulse rate from the veins at the back of the hand. There may be other sensors such as a light sensor. These and others sensors such as location sensors, environment sensors and motion sensors are not ruled out. There may also be gyroscope, accelerometer and thermometer.

These and other aspects of the embodiments herein are further described in detail with the help of the accompanying drawings and the description, where similar numbers are used to identify similar features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 2A is an illustration of an embodiment of a wear-mechanism for wearing on the back of the human hand that is suitable for attaching an electronic device;

FIG. 2B is an illustration of size and form of the electronic device for attachment to the wear-mechanism for the back of the hand;

FIG. 2D is an illustration of a swivel attachment mechanism for changing the orientation of the electronic device between portrait and landscape orientations on the back of the hand;

FIG. 3A is illustration of an electronic device being worn on the back of human hand with attachment to the wear-mechanism on the back of the hand in portrait form;

FIG. 3B is illustration of an electronic device being worn on the back of human hand with attachment to the wear-mechanism on the back of the hand in landscape form;

FIG. 8A is an illustration of functions present in the electronic device on the back of human hand;

FIG. 8B is a simplified illustration of functions present in the electronic device on the back of human hand;

FIG. 9A is an illustration of use of wrist movement for control of the electronic device on the back of human hand;

FIG. 11 is a method diagram of a device and a wearing mechanism for the back of the human hand;

FIGS. 13A-13B are simplified illustrations of an application embodiment of device for swing analysis for a golf club swing; and FIGS. 14A-14B are simplified illustrations of an application embodiment of device for swing analysis for a golf swing and the displays there from.

FIG. 15B is a simplified illustration of the functions and steps for an application for bio-feedback.

DESCRIPTION

Introduction

The embodiments herein disclose a hand wearable electronic device positioned on back of the hand between the wrist joint and the finger joints, an area known as opisthenar.

Figure 1:
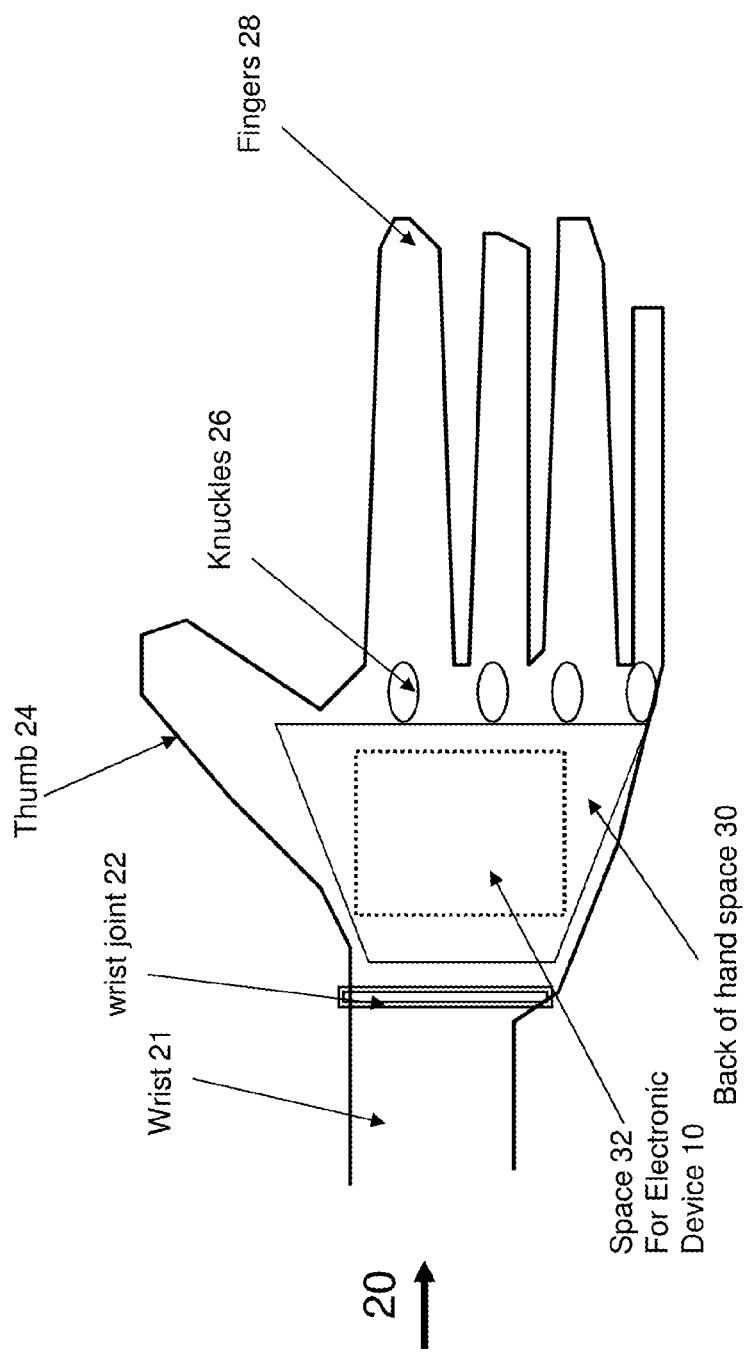
FIG. 1 is a simplified illustration of an embodiment of a space on the backhand of a human hand for positioning an electronic device thereon.

With reference to FIG. 1, a human hand 20 has the parts of a wrist 21, a wrist joint 22, a thumb 24, fingers 28, knuckles 26 and has a back of hand space 30.

On the back of the hand space 30, that may resemble roughly a trapezoid shape, may be identified a space 32 that may be advantageously used for the placement of an electronic device 10.

Such a space 32 for positioning a device 10 on the back of the hand space 30, it is believed, would have features and advantages relative to wearing a similar device on the wrist of the hand. These features and advantages, it is believed, may include easier viewing access and easier control access, compared to a watch type device worn on the wrist. These features and advantages may also include a device with a relatively larger digital display screen, relative to prior art devices worn on the wrist.

The device may also have an ability to orient the image that is more suitable for viewing the screen. Similar feature exists in prior art devices that change the screen to between landscape and portrait orientations depending on how the device is held in the hand. A similar approach may be utilized with the device of the embodiments herein depending on how the back of the hand and thus the device is oriented to the face of the human wearing the device.

There may be other advantages as well, as for sports applications that enable hand motion or swing dynamics analysis. The device is securely fastened or attached to the back of the hand and is able to withstand humidity, sweat, temperature and shock.

As shown in FIGS. 3A and 3B, the device 10 is worn on the back of the hand 20 and is anchored thereon, as illustrated in FIG. 2A, by an embodiment of a wear-mechanism 12. There may be different types of wear-mechanisms 12. Five different types of wear mechanisms 12 are described while others are not ruled out. Some of these wear-mechanisms 12 may be preferred by some users while others may be preferred by other users.

An embodiment of wear-mechanism 12 as illustrated later with the help of FIG. 2A is such that it does not affect or obstruct the use of the hand 20 for other tasks. Other wear-mechanisms that are described also do not affect or obstruct the use of the hand for different types of tasks that are performed by a hand.

An electronic device 10 that may be used with the wear-mechanism 12 has been illustrated with the help of FIG. 2B, where a side view 10A and a plan view 10B of device 10 are illustrated. As in the plan view 10B, the device 10 has a display screen 16 and a touch screen 17 in a body 18.

As shown in side view 10A, the device has a thickness 13A that is notionally ¼ inches. The device 10 may have a slight curvature 11 to substantially match the curvature of the back of the hand.

As illustrated in the plan view 10B, the device 10 has a screen size notionally 2" in length 13 and notionally 1.5" in width 14. The diagonal dimension 15 would notionally be 2.5". Such a screen size, it is believed, provides a bigger screen size and thus a bigger display area than that may be available from a watch type device worn on the wrist.

The back of a hand space 30 for use as a space 32 for positioning of device 10, provides features and advantages such as access/visibility of the back hand that is controlled by two different motions, that of an elbow and a wrist. Movement of an elbow provides a 180 degree rotary motion and movement of a wrist provides both up and down and side ways movement as compared to a watch on a wrist, where access is only controlled by 180 degree rotary motion of the elbow joint.

Further, it is believed, a device positioned on the back of the hand would not have obstruction issue by clothing worn on the sleeve. Further still, use of the back of the hand 30 would not obstruct or impair hand function.

The device may use AMOLED screen technology enabling the screen to be curved. The device has ergonomic features in shape and size that makes it desirable to be comfortably worn on the back side of the hand for a better part of the day.

Wear-Mechanism 12

There may be different type of wear-mechanisms that may be advantageously used. Some of these are described with the help of FIGS. 2A, 3A, 3B, 4, 10A, 10B, 10C and 10D, while others are not ruled out. These Figures provide simple illustrations of different type of harnesses, one type of harness uses thin straps of suitable material and another type of harness uses different embodiments of partial or full gloves.

In some of these embodiments, to remove the device 10 from the back of the hand, the entire harness is removed, while in other embodiments, the device 10 is attached to the harness by an attachment mechanism, enabling the device 10 to be easily detached and attached to the harness. These mechanisms are described herein.

For a wear-mechanism for use with the device 10 on the back of the hand space 32, the wear-mechanism 12 may be a harness made of thin straps of suitable material and a means to mount the device thereon.

As illustrated with the help of FIG. 2A, in this simplified illustration, the wear-mechanism 12 on the back of the hand 30 has loop 42 worn close to the wrist joint 22. Two longitudinal members 44A and 44B, on one end are anchored to half loop 46 clips positioned in the joint between the fingers and on the other end are anchored 45 to the wrist loop 42.

The half loop 46 clips may have three half loops joined together that are positioned on the front side of the hand around the index, middle and third fingers. The members 44A and 44B attach to the loop clips 46 on one end and to the wrist loop 42 on the other end.

Two vertically positioned cross members 48A and 48B are positioned across and attached to the longitudinal members 44A and 44B. A bridge member 49 joins the cross members 48A and 48B. An attachment mechanism 50 is positioned on the bridge member 49. The attachment mechanism 50 may be a combination of rotary and or slide mechanism that makes it easier to quickly and conveniently remove and reattach the device 10 to the wear-mechanism 12. Such attachment mechanism 50 are generally prior art and are adapted for the application for the embodiments herein.

For some users depending upon the digital content being displayed on the device 10 screen it may be advantageous to view the display in a landscape orientation such as for movie or video clips. Therefore, attachment mechanism 50 may also provide in some embodiments to be able to swivel the device 10 between a portrait and a landscape orientations and vice-versa on the back of the hand.

As illustrated with the help of FIG. 2D, the swivel attachment mechanism 50 has indent or attach positions 50A and 50B that provide for the device 10 to be arranged either in a portrait orientation 50A or a landscape orientation 50B. The swivel mechanism 50 may provide for the device to be removed as well as attached in either a portrait 50A or landscape orientation 50B relative to the back of the hand and the user viewing the display screen of the device 10.

In general, swivel and slide mechanisms are prior art and have been extensively used in prior art in earlier models of a variety of cell phones from a large number of different manufacturers, such as Motorola. This disclosure is limited to use of such prior art mechanism to the application of attaching a device 10 to the wear-harness 12 on the back of the hand 20 and is not intended to teach or claim a new art on swivel/slide mechanism.

To re-position the device 10 from a portrait orientation to a landscape orientation the device 10 is slid down from position 50A, then rotated ninety degrees and then slid out to position 50B of the swivel attachment mechanism 50. This swivel mechanism 50, it is believed, maintains the separation distance of the edge of the device 10 that is next to the wrist joint away from the wrist in both of these positions. FIGS. 3A and 3B show the device on the back of the hand in these portrait and landscape orientations respectively.

As illustrated with the help of FIGS. 3A and 3B, in an embodiment 60A, the use of wear-mechanism 12 on hand 20, as has been illustrated with the help of FIG. 2A, is used for attaching or mounting the device 10 on to the wear-mechanism 12.

Figure 4:
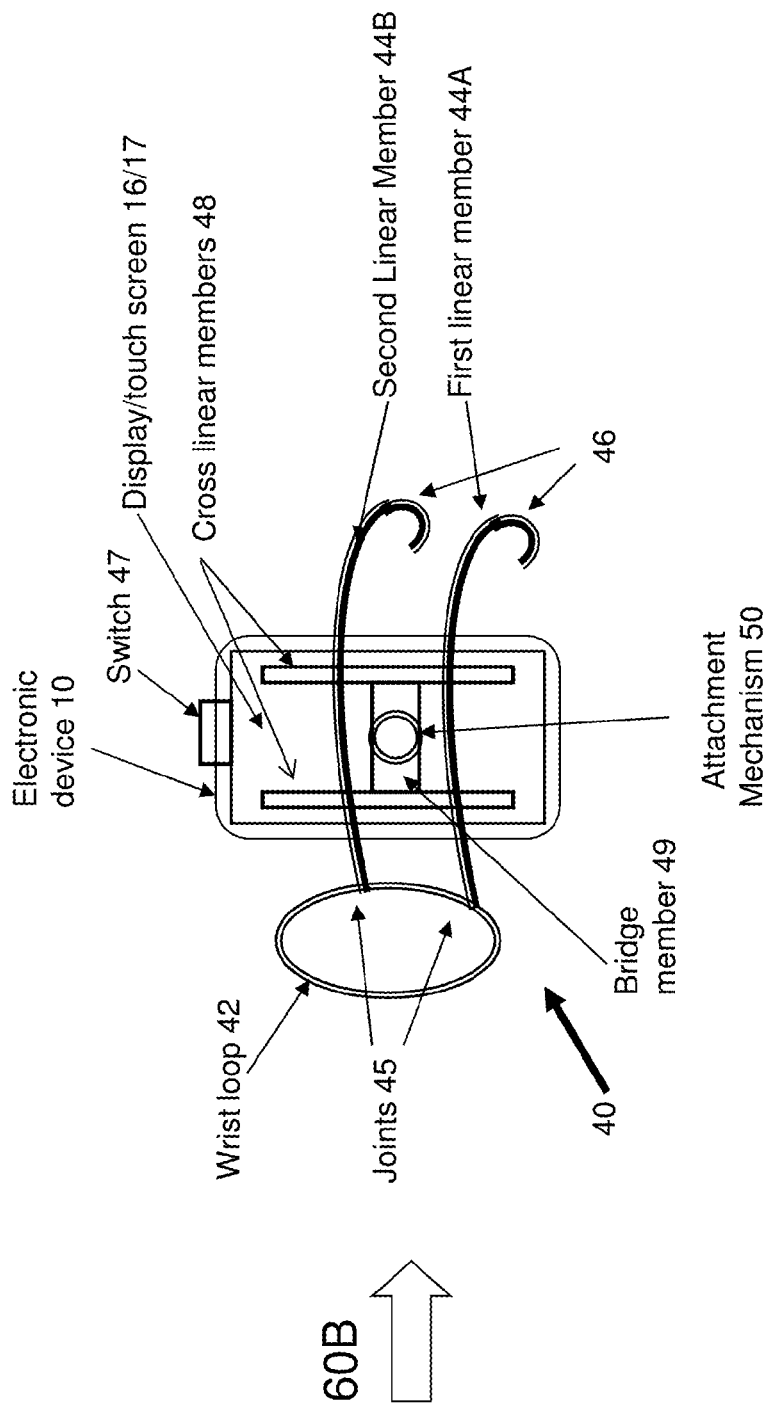
FIG. 4 is another illustration of an electronic device being worn on the back of human hand with attachment to the wear-mechanism on the back of the hand.

An alternate embodiment 60B is also illustrated with the help of FIG. 4. In the alternate embodiment 60B, the wear-mechanism 12 has two finger clips 46 positioned in the spaces between index and middle finger and between middle and third finger. The finger clips 46 in the form of half loops are attached via first and second linear members 44A and 44B to a loop 42 around the wrist joint, where the wrist loop 42 is positioned around the wrist using a Velcro loop or band around the wrist part closest to the wrist joint.

With reference to FIG. 4, the embodiment 60B has a wrist loop 42, a first linear member 44A and a second linear member 44B that are attached at one end 45 with the wrist loop 42 and at the other end terminate in two half loops 46.

Two cross linear members 48 attach to and across the first and second linear members 44A and 44B. A bridge member 49 optionally connects the two cross members 48. The bridge member 49 may have an attachment mechanism 50 for attaching an electronic device 10 to the wear mechanism 60B.

Alternatively the device 10 may be attached to the mechanism 60B by an attachment mechanism that may be built in the cross members 48 and the back of the device 10. Such a mechanism may include a removable adhesive material such as a Velcro type.

As illustrated with the help of FIG. 4, in this embodiment 60B, the wear mechanism 40 may have two long longitudinal thin strip members terminating in U shape clips—one clip positioned between the index and middle finger and other clip positioned between the middle and third finger. Strips are smooth plastic and U clips are flexible smooth plastic.

In another such embodiment, a single horizontal wide cross member (not shown) that is joined to two strip members ending in two U clips may also be used. One end of such a cross member may be positioned in space between the thumb and the palm of the hand and the other end around other end of the palm. As an example, there may be additional clips that may be used. As a simplified example, a clip means on the side of the hand (not shown) may be used. At the two ends of the cross member, U clips may be used that bend with an adjustable angle around the palm of the hand.

With reference to FIG. 4, the device 10 has a display screen 16 and touch screen 17 and may also have switch controls 47 that may be positioned on the edge of the device 10.

The wear-mechanism 60A or 60B may be worn first on the back of the hand and then the device 10 is attached to the mechanism. Alternatively the combination of device 10 and mechanism 60 may be worn on the back of the hand.

To wear the wear-mechanism 60A or 60B, the loop 42 is first worn or anchored around the wrist and then the half loops 46 are engaged in the space between the fingers. The loop 42 is preferably of soft cloth-like plastic and is in the form of a narrow strip, preferably notionally ¼" in width and sized to the aspect of the wrist where it will be positioned.

The linear members 44A and 44B are made of smooth and flexible plastic strips that may be made of an elastic or stretch material. The members 44A and 44B may be ⅛" wide and may be circular in cross-section shape. They may other shapes as well. These are notional dimensions.

The ends in the form of half loops 46 as well as the entire linear members 44A and 44B are made of material that is flexible and yet rigid and is flexibly contoured to the back of the hand and of a length that reaches and be positioned in the space between the fingers. Such type of materials are commonly used in prior art for many different medical and other applications.

There may a third linear member (not shown) that may also be used. Each of these linear members 44A, 44B and 44C (not shown) may be advantageously and naturally positioned or occupy the space between the veins on the back of the hand.

Alternatively the wear-mechanism 12 may be a half glove as illustrated later with the help of FIGS. 10A and 10B. The glove may also be of different types and materials. Some glove types cover the back of the hand and some part of fingers and not the palm of the hand to provide a wear-mechanism for the device 10. In these glove type wear mechanisms, the device 10 may be attached to the back of the hand on the glove part positioned on the back of the hand via a Velcro type attachment.

Figure 10A:
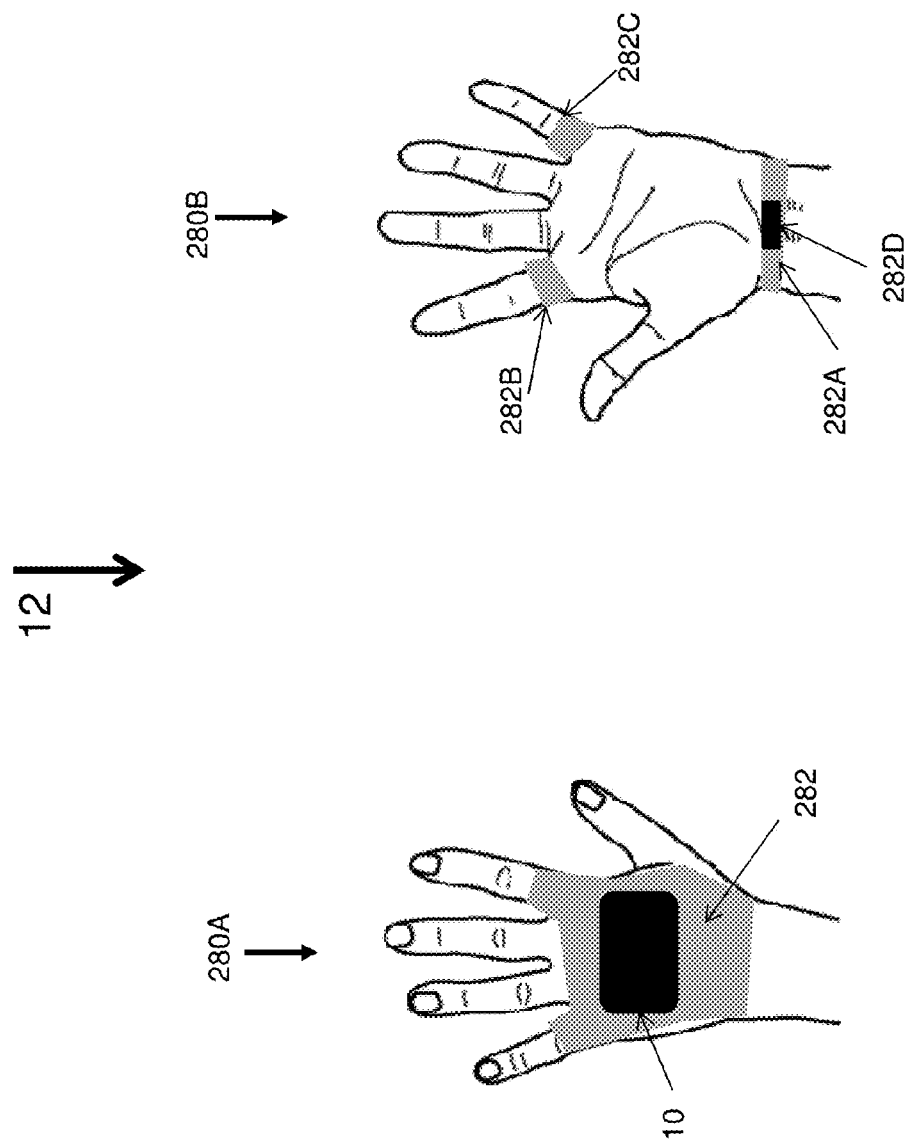
FIGS. 10A-10B are simplified illustrations of half glove that may be worn on the hand to which the electronic device may be attached to the back of the human hand.

FIG. 10A illustrates another embodiment of the wear-mechanism 12 that may be in the shape of a half glove 282 as shown and the device 10 may be mounted on the glove 282 on the backside of the hand. Such wear-mechanisms are not ruled out.

FIG. 10A illustrates a back of the hand view 280A and a front of the hand view 280B. The view 280A illustrates that the half glove 282 covers a part of the back of the back of the hand and is anchored to the hand as illustrated in view 280B, by glove portion 282A around the wrist, glove portion 282B around the index finger, and glove portion 282C around the little finger. The glove part 282A around the wrist is attached to the wrist with the help of a clasp 282D.

Figure 10B:
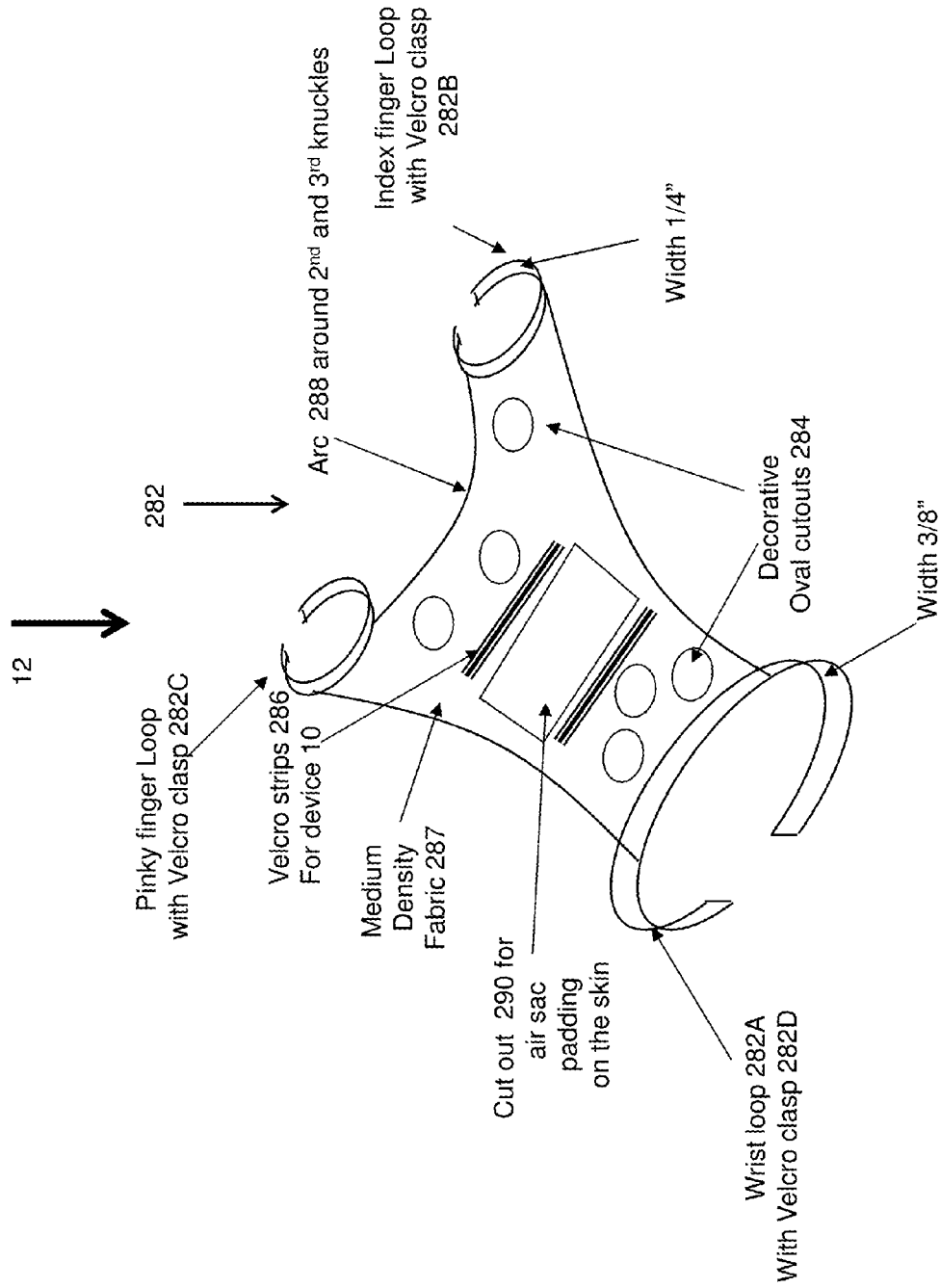

FIG. 10B illustrates a version of a back of the back of the hand glove 282 of FIG. 10A. As illustrated in FIG. 10B, the glove 282 is preferably made of medium density stretch fabric 287, which can be worn for a better part of the day and is sturdy enough to support the device 10 with a notional weight of 40 grams with the help of Velcro strips 286. The medium density fabric 287 may be made of suitable man made material such as artificial leather or other woven fabric.

As illustrated in FIG. 10B, the glove 282 on the back of the hand has arc 288 around the second and the third finger knuckles and also may have decorative cutouts 284 that may in the shape of oval. As illustrated the glove 282 also has a cutout 290 for positioning of the air sac 310 padding on the skin of the back of the hand and that is used for a pulse sensor.

The index and little finger loops 282B and 282C may notionally be ¼" wide and the wrist loop 282A may notionally be ⅜" wide. The index finger 282C and the little finger loops 282B may be complete pre-made loops or may have loops that are made with the help of Velcro closures.

In some embodiments the index and little finger loops 282B and 282C may be complete loops enabling glove 282 to be quickly slid on the back of the hand through the loops 282B and 282C on to the little and index fingers and then the wrist loop 282A quickly tied around the wrist with a wrist clasp 282D or a Velcro clasp. Undoing the clasp 282D enables the glove 282 to be also quickly removed as well.

In some embodiments the device 10 may be mounted on the glove 282 using the attachment mechanism 50 as had been earlier illustrated. The attachment mechanism 50 enables the device 10 to be swiveled on the back of the hand between portrait and landscape orientations. Use of mechanism 50 may raise the height of the device from the top of the hand by notionally ⅛ or possibly ¼" from the surface of the back of the hand. Alternatively the device 10 may be physically removed from the Velcro fasteners and repositioned in the landscape orientation.

The device 10 is worn on the back of the hand using one of the various types of wear-mechanism 12 that have been described. The preferred notional size of the screen is 1.5" wide and 2.0 inch height and thus 2.5" in diagonal. Since the device is positioned on the back of the hand, and the back of the hand is positioned in front of the face, when the elbow is bent and the back of the hand brought near the face, some users would prefer a portrait orientation all the time, some users would prefer landscape orientation all the time and some users would like the flexibility to be able to switch from one orientation to another orientation. In the wear-mechanism embodiment illustrated with the help of FIGS. 10A and 10B, the device 10 is attached to the glove 282 via Velcro attachment. Therefore in these embodiments of the wear-mechanism 12 the orientation of the device 10 on the back of the hand may be easily changed to different orientation by removing the device and reattaching the device in a different orientation, based on the user's preference sometimes, based on the type of digital content being viewed, or all the times being positioned in one orientation.

Some types of half gloves (not shown) are used in some sports that leave the finger and thumb visible outside the glove area for tactile feel. This type of wear-mechanism may cover the back of the hand and some part of the rest of the hand.

This type of wear-mechanism may be made of thin leather or suitable fabric and have an attachment means to attach the device 10 to the back of the hand.

Figure 10C:
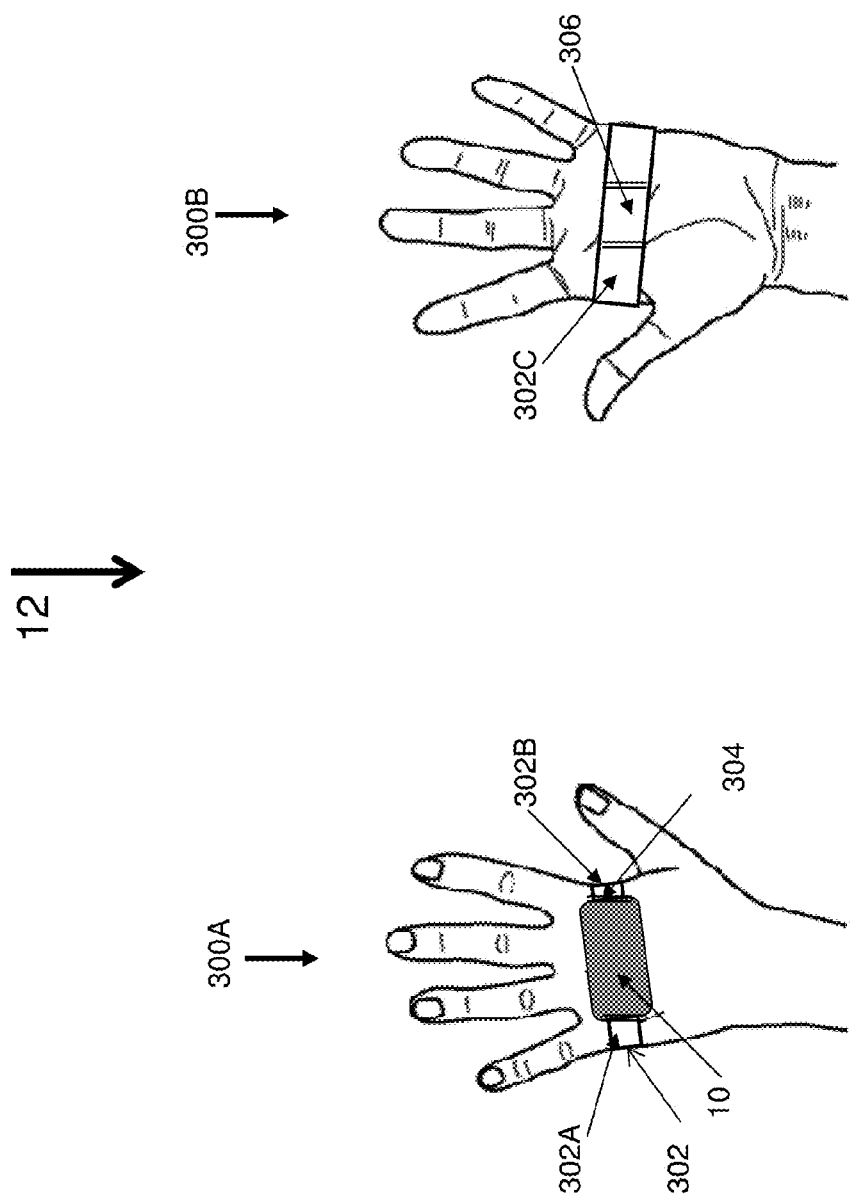
FIG. 10C is a simplified illustration of alternative embodiment of wear-mechanism that may be worn on the hand to which the electronic device may be attached to the back of the hand of the human hand.

Yet another embodiment of wear-mechanism 12 is illustrated with the help of FIG. 10C. As illustrated in a simplified illustration with the help of FIG. 10C, view 300A shows a back side of the hand and view 300B shows a front side or a palm side of the hand. As illustrated in view 300A, the electronic device 10 may be positioned on the back of the hand using straps 302A on one side of the device 10 and strap 302B on the other side of the device 10. The straps 302A and 302B are part of the strap 302C that ties around the palm in the front of the hand as shown in view 300B. The strap 302C is anchored on the palm with the help of Velcro type anchor 306.

The strap 302 ends 302A and 302B are attached to the device 10 with the help of anchor 304. The anchor 304 may be of a type that is used in watches or may be of a different design. The strap 302 with its parts 302A, 302B and 302C with the help of attachment 306 keeps the device 10 firmly positioned on the back of the hand. The strap 302 may be made of any suitable material and may be fabric or plastic or a stretch fabric of durable strength for this application. Alternatively the strap 302 may be an elastic belt-type adjustable band.

This embodiment as is illustrated with the help of FIG. 10C may be preferred by some users for its ease and use of simplicity even though a strap 302C runs across the palm of the hand. Given the strap is notionally ½ inch wide and made of thin fabric or plastic, a user may prefer this wear-mechanism for its simplicity and ease of use in putting it on and removing it when not needed.

The wear-mechanism 12 may also have different embodiments and these are not ruled out. In one embodiment of wear-mechanism 12, as illustrated with the help of FIG. 10D, the device 10 has a convex curved screen 162 to match the curvature of the back of the hand. The device 10 has a padded bottom 156 that makes the device 10 to be comfortably positioned on the back of the hand over the tendons and the veins. The padding 156 also has sensor to determine pulse rate from these blood veins.

Figure 10D:
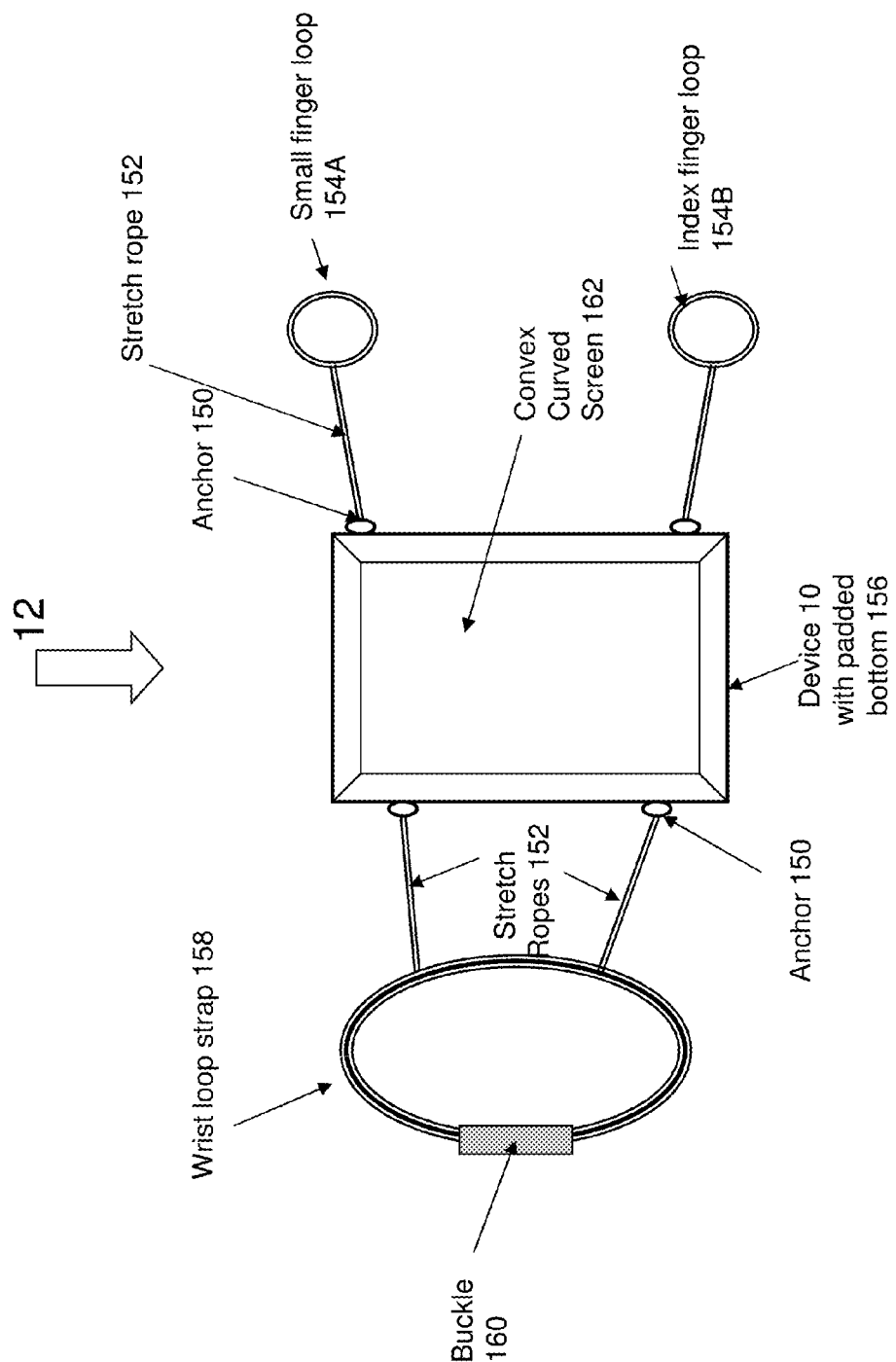
FIG. 10D is a simplified illustration of another embodiment of a wear-mechanism.

The device 10 has anchors 150 that are positioned on the sides of the device 10 as shown in the FIG. 10D. Two of these anchors 150 are positioned on the left side of the device and two of these anchors are positioned on the right side of the device. These anchors provide for a tiny hook or anchor to be able to attach string or rope. These anchors may be hidden under the device or may be visible on the sides of the device. Such anchors are commonly used in prior art to attach a string.

Each of these four anchors 150 has a stretch string or rope 152 tied to the anchor 150. The stretch ropes 152 on the right side of device 10 terminate or end in small finger and index finger loops 154A and 154B respectively. The finger loop 154A is for positioning around the small finger and the finger loop 154B is for positioning around the index finger.

On the left side of the device 10, the stretch ropes 152 terminate or end being attached to a wrist strap 158. The wrist strap 158 has a buckle 160. The wrist strip may be similar to as used in a conventional watch, but made of softer and less wide material than a conventional watch strap.

Given the preferred size of the device 10, which may notionally be 1.75" wide and 2.25" inch long, the length of the stretch ropes 152 may notionally be ¾ to 1.25 inches and may vary for different hand sizes. The finger loops 154A and 154B are sized to fit around the index and small finger and are of a suitable diameter and preferably made of the same stretch rope material as are the stretch ropes 152. The stretch ropes may be of a comfortable to skin and soft rope like material that may be notionally ⅛" or less in diameter.

To wear this wear-mechanism 12 that is attached to the device 10 via the four anchors 150, the finger loops 154A and 154B are first positioned on the two fingers and the device is then laid on the back of the hand and then the wrist loop strap 158 is tied with the help of buckle 160. It is believed this embodiment of device 10 and wear-mechanism 12 being simple in design, it would be preferred and convenient to use for some users.

The wear-mechanism 12 may be made in different sizes to accommodate hand sizes of males and females or may be made in sizes such as small, medium and large to accommodate different hand sizes.

Electronic Device 10

Figure 5:
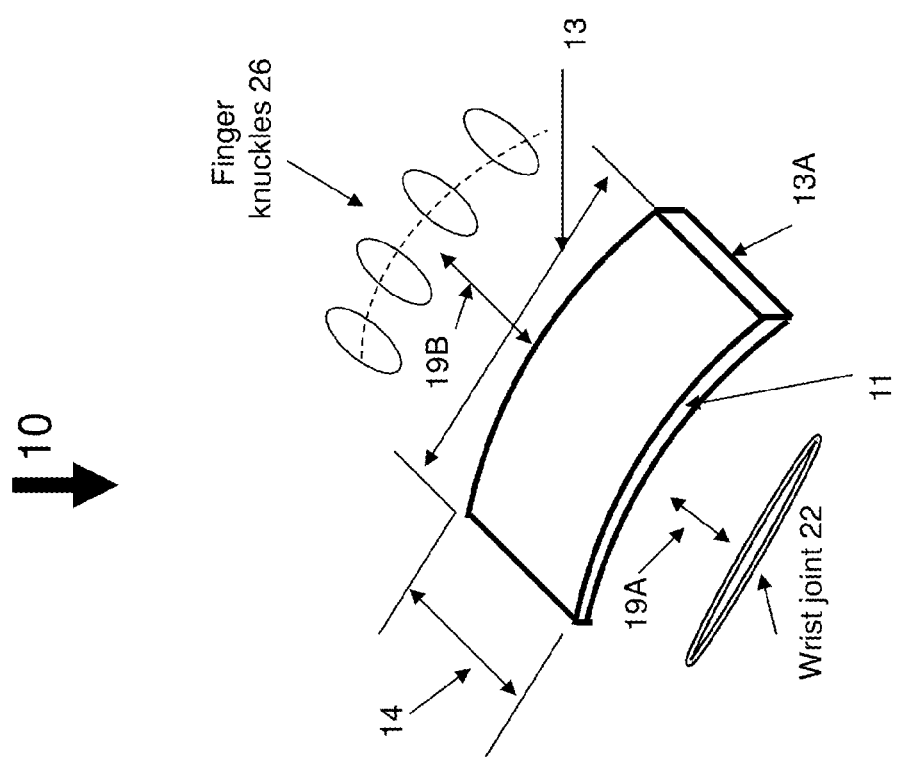
FIG. 5 is an illustration of an electronic device on the back of human hand with placement relative to wrist joint and finger knuckles.

With reference to FIG. 5, the size and shape of the electronic device 10 has a width 14, length 13, and a thickness 13A. The device 10 may be positioned clear of the wrist joint 22 with a distance of 19A and clear of the knuckles with a distance of 19B.

Figure 2C:
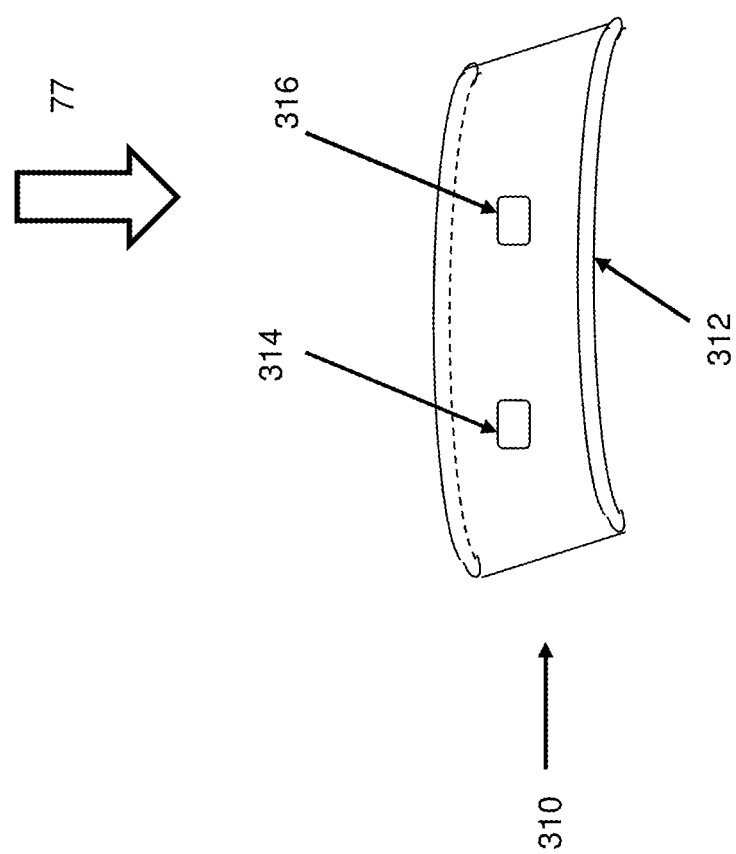
FIG. 2C is an illustration of a pulse sensor in the electronic device for the back of the hand.

FIG. 2C illustrates an air sac 310. The air sac 310 is intended to be placed or used under the device 10. As illustrated in FIG. 5, the device 10 has a curvature 11 that matches the curvature of the back of the hand. The curvature 11 may be made flexible with the use of an air sac 310 as has been illustrated with the help of FIG. 2C or use of a rubber like pad. The air sac 310 along with use of such an air sac for a pulse rate sensor has been illustrated later with the help of FIG. 2C.

The length 13 may notionally be 2.5 inches; the width 14 may be notionally 1.5 inches. The thickness 13A may be notionally ¼ inches. The gap distances 19A and 19B may notionally be ½ inch each.

These dimensions of the device 10, it is believed, provide for an easy to use device 10 anchored as shown with mechanisms 60A or 60B and positioned on the opisthenar of the hand.

Device and Screen Size:

The size of the screen 17 of device 10 may be equal to or greater than one square inch and less than or equal to nine square inches.

Alternatively, size of the screen 17 of device 10 may be equal to or greater than two square inches and less than or equal to eight square inches.

Alternatively, size of the screen 17 of device 10 may be equal to or greater than three square inches and less than or equal to seven square inches.

Alternatively, size of the screen 17 of device 10 may be equal to or greater than four square inches and less than or equal to six square inches.

Alternatively and non-exclusive embodiments of device 10 for different size hands, the size of the screen 17 may be one square inch, or two square inch, or three square inch, or four square inch, or five square inch, or six square inch, or seven square inch, or eight square inch, or nine square inch.

Figure 10E:
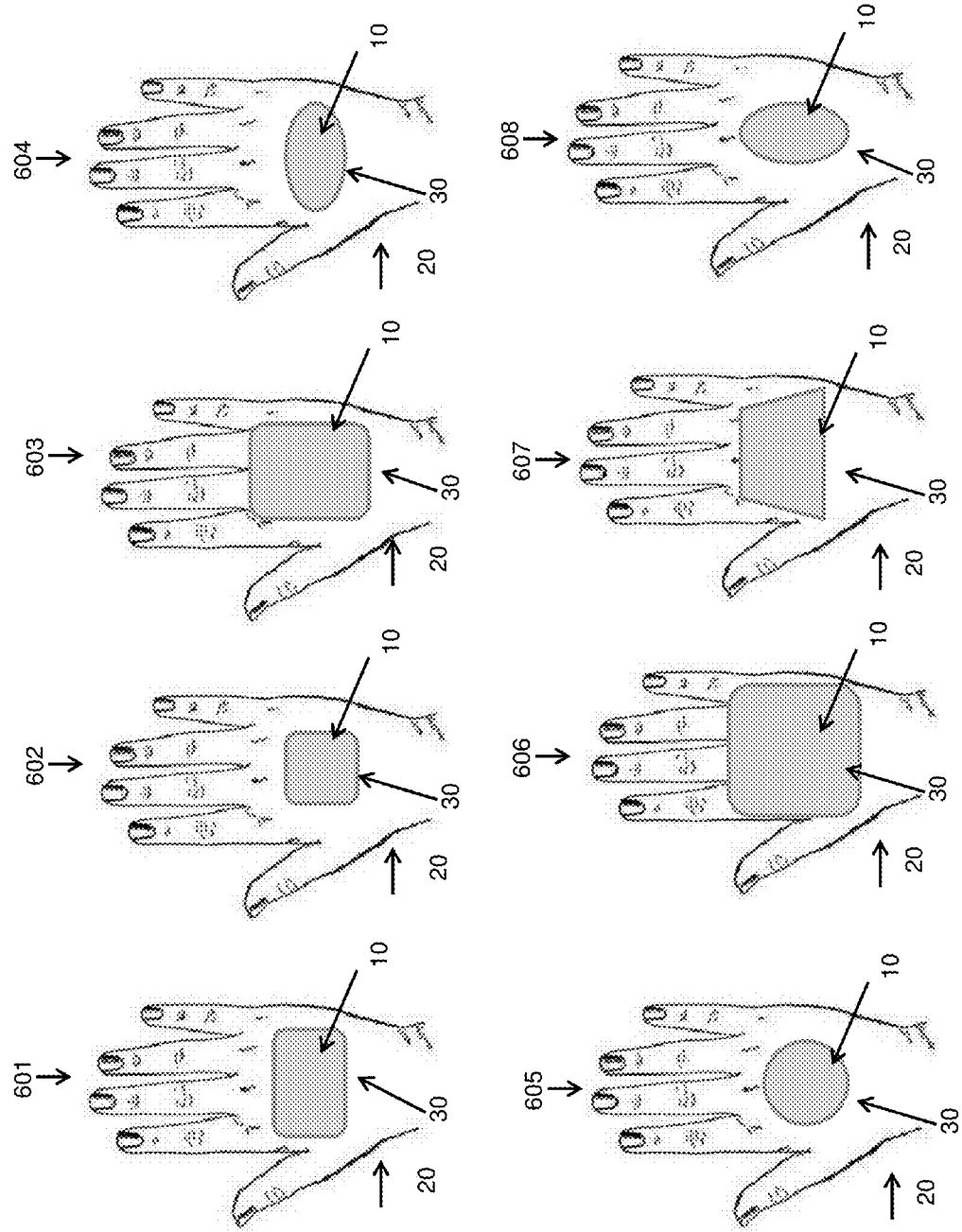
FIG. 10E is a simplified illustration of embodiments with different size and shape electronic devices on the back of the hand.

As illustrated with the help of FIG. 10E, within these size limits, the size of the device may be any size and shape based on the size of different hands and the preference of the users. The size of the hands would differ based on female and male hand sizes and physique of a person.

As illustrated in FIG. 10E, views 601 to 608 illustrate different sizes and shapes of device 10 that is mounted on the space 30 on the back of the hand 20.

As illustrated in view 601, the size of the screen may be a rectangular shape, may be mounted on a landscape orientation and may be suitable for average size hands.

As illustrated in view 602, the size of the screen may be a square shape, mounted in the middle of the space on the back of the hand and may be suitable for small size hands.

As illustrated in view 603, the size of the screen may be a rectangular shape, mounted in a portrait orientation and covering a portion of the knuckles and may be suitable for medium size hands.

As illustrated in view 604, the size of the screen may be an oval shape mounted in a landscape orientation and may be suitable for average size ladies hands.

As illustrated in view 605, the size of the screen may be a circular shape for mounting in the middle of the space on the back of the hand and may appeal to ladies with small size hands or children with small hands.

As illustrated in view 606, the size of the screen may be a square shape and mounted covering the knuckles for large size hands and for those who prefer a big size screen.

As illustrated in view 607, the size of the screen may be a trapezoidal shape covering most of the area of the back of the hand and may be preferred by those who like an unusual shape screen or relatively a larger screen size.

As illustrated in view 608, the size of the screen may be an oval shape mounted in a portrait orientation and may appeal to ladies with medium size hands for medium size hands.

There may be other sizes, orientations and shapes of the screen 17 and device 10 than those that have been identified above and these are not ruled out.

These different size and shape of device 10, as had been illustrated with the help of views 601 to 608, may appeal to different customers based on their hand sizes and their preferences in both the size of the device and the shape of the device 10. Thus a prospective customer may be able to select a device and screen size that suits his/her preferences in size, functionality, and aesthetics.

Optionally, the display screen has a plurality of curved edges. The shape may be oval, or circular, or some other shape, as are many prior art watches. Devices with such screen sizes would enable free use of the hand for other tasks.

Even though a preferred screen size may notionally be 1.5" wide and 2" in length, these sizes may be different then these dimensions. This preferred size is based on the space available on the back of the hand that is clear of the wrist joint and also clear of the finger joints.

Such a device in weight notionally may be around forty grams, based on calculating a proportional weight from the weight of iPhone 5 which is 114 grams and it is assumed that the weight of device 10 would be approximately ⅓ of that of the iPhone 5, assuming the device 10 is ⅓ in size of the size of the iPhone5.

This would yield a weight of approximately forty grams or one and one half ounce. It is believed a device of this size and weight may be comfortably worn on the back side of the hand.

However in some embodiments the device may extend onto and beyond the finger joints and may extend up until the 2nd finger joints. Such an extended device would still leave the hand free for normal hand use and may be preferred by some users as providing a large screen area that may be close to what smart phones may provide, such as iPhone 4 with a diagonal screen size of 3.5 inches from Apple.

Such an extended embodiment of device 10 may replace a smart phone, enabling the device 10 to be used as a stand-alone device as a smart phone or in the attached position on the back of the hand also as a smart phone.

Therefore, in some embodiments, the device or screen size may be (i) 2" by 2.5", or (ii) 2" by 3", or (iii) 2" by 3.5", where the size in width that extends beyond 2.0 inches would occupy the space on top of knuckles and may occupy space up until the middle joint of the fingers.

These sizes it is believed also leave the hand free for other tasks that a hand may perform and where the larger screen size provides for some users features of screen size that they may find desirable. For such extended device screen sizes, additional tie loops around some of the fingers may be used to provide for a stable and/or sturdy wear-mechanism. These may be suitable for some users who prefer their version of device 10 has and perform fewer functions that are of interest to them.

Charging of the Device Via Solar Cells

The electronic device 10 may be charged in traditional ways as taught in the prior art or it may be charged using solar cells. Given that this device is being worn on the back of the hand and thus exposed to ambient light, solar charging may be a viable method for charging the device, unlike other prior art devices such as smart phones that are carried in the pocket and thus could not be charged with solar methods.

The solar cells may be conventional solar cells as used in solar powered calculators on the strip for solar charging. The solar cells that are that type are commonly used in prior art calculators.

Figure 6A:
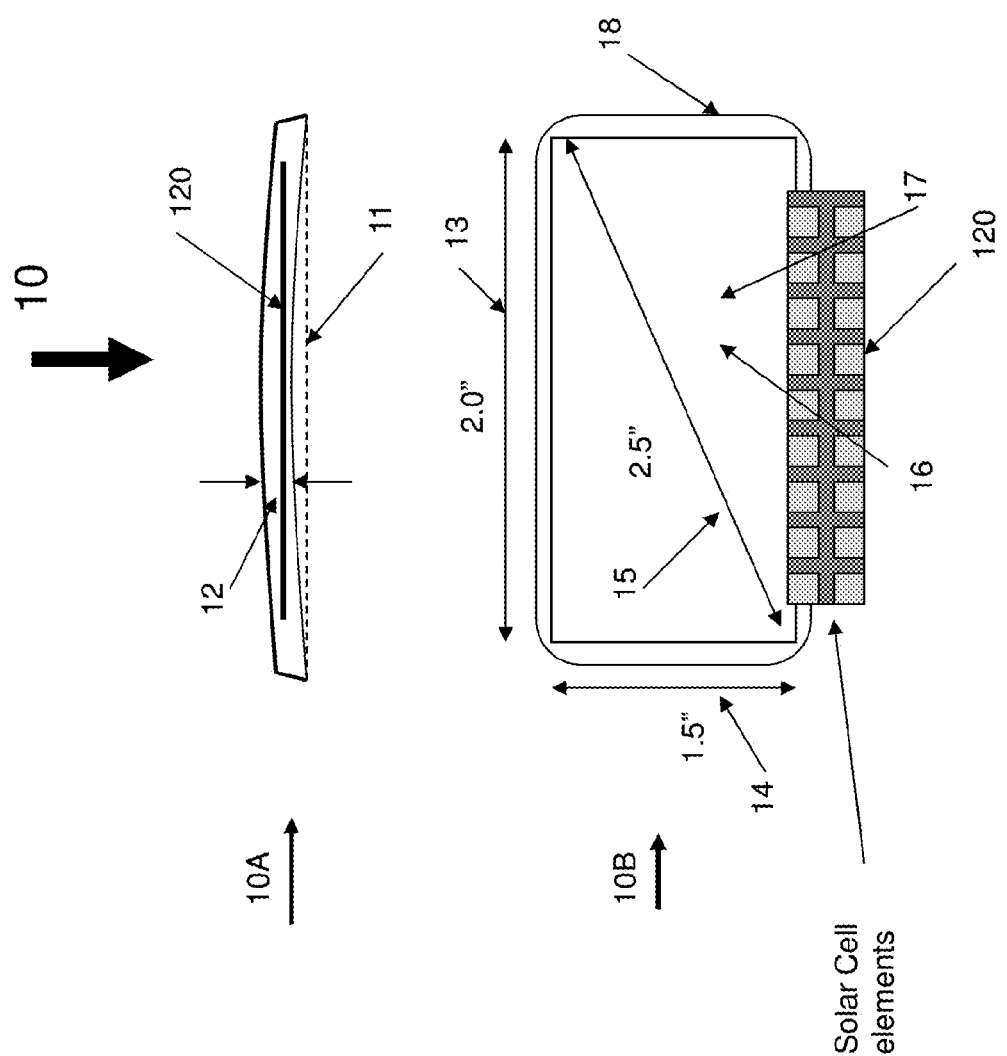
FIGS. 6A-6B-6C are illustrations of use of solar cells for charging the device for the application of the electronic device on the back of human hand.
Figure 6B:
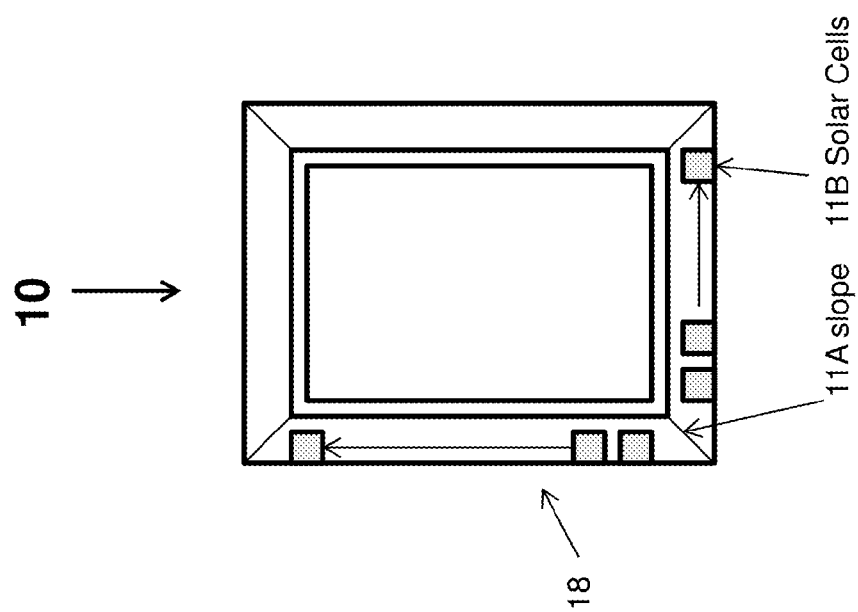

As illustrated with the help of FIGS. 6A and 6B, such solar cells may be used in different configurations that are advantageous for this type of device. In one such configuration, as illustrated in FIG. 6A, the solar cells may be positioned in an extension of the device near to the knuckles. The extension to the device for this purpose may be a strip 120 notionally ½" in width and notionally 2" in length. Such a strip 120 may be able to accommodate many solar cell elements, such as sixteen solar cells.

Alternatively, as illustrated with reference to FIG. 6B, the solar cells may be positioned on the four edges of the device, where the edges are sloped downward at notionally a 45 to 60 degree angle, providing a space for studding or mounting solar cells on the four edges of the device.

As illustrated in FIG. 6B, the edges 11A of the device 10 may be sloped outward with a slope notionally of 45 to 60 degrees. This edge slope may be used to position solar cells 11B on the edges 11A of the device 10. If a solar cell is made of a size of ¼" square, then twenty-four such solar cells on a device that is 2 inch long and 1.5 inch wide may be used. Assuming such a solar cell is ¼" in size, close to twenty four such cells may be positioned. It is believed such solar cells would provide significant energy to keep the device battery charged.

Figure 6C:
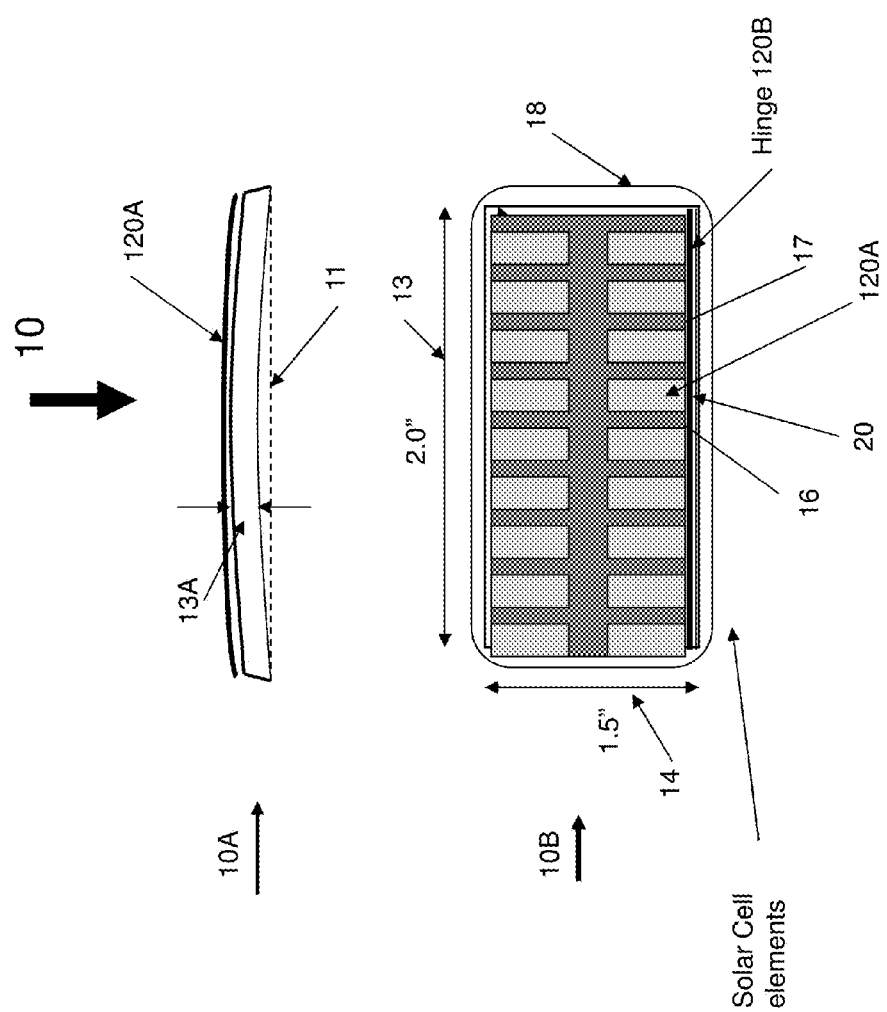

In an alternative configuration, as illustrated in FIG. 6C, a plate of solar cells may be used as a flip cover 120A over the device screen, where the cover 120A is hinged 120B on one end of the device that is close to the knuckles. The flip cover 120A may cover the screen when the device is not in use and expose the screen for use when the cover 120A is flipped open to be over the knuckles when the device is to be used. The command or the energy to flip open the flip cover 120A to access the display screen or to close the cover 120A when the device screen is no longer need to be viewed may be controlled or provided by a jerky wrist motion.

During daylight hours or indoors with lighted areas, the solar cells in any of the configurations described above are exposed to ambient light, when the device 10 is worn on the back of the hand or placed on a table. Such an ambient light, it is believed, is adequate to charge the battery of the device and in some modes of use provide some or most of the power that would be used by the device 10.

Charge Coupled Device (CCD) is a technology that has been widely used for imaging applications. CCD contains a large number of pixels arranged in a grid where each pixel is sensitive to light and where each pixel captures light falling on the CCD sensor that is proportional to the light intensity and generates a proportional charge in the pixel.

In imaging applications, a shutter exposes the CCD to light through a lens and a matrix of charge values for each pixel is collected and stored in memory. The matrix of stored charge values represent the image falling on the CCD through a lens. The value of charge in each pixel is channeled to a storage memory. Color CCD is also common in imaging applications where each pixel is a group of three pixels sensitive to the light of primary colors.

While the traditional solar cells are efficient in collecting solar energy in the range of 10%, CCD is efficient in collecting solar energy in the range of 95% based on an article in Wikipedia. It is believed the reason for such a large difference in efficiency may be due to reflection from the surface of solar cells and capturing more solar energy in a pixel or a well-like structure of a pixel in the CCD.

It is believed that the CCD technology may be advantageously adapted for solar cell application. In these adaptations, only the ability of charge collection by the CCD is retained and not the ability of the CCD for imaging application.

Therefore, for the device of the embodiments herein, the solar cells may be conventional as used in solar powered calculators or use CCD elements on the strip for solar charging, where the solar cells may be customized CCD cells which also collect solar energy. That is the technology of CCD may be adapted to collect charge for battery charging application.

The CCDs for solar cell application may collect charge in pixels and then channel to one sink. Also in this application of CCD for solar cells, there may be fewer pixels in solar application as compared to imaging application.

In an imaging application, a ¼" square CCD may have a million pixels in a grid of 1000 by 1000 pixels, whereas a grid of 100 by 100 or even 10 by 10 pixels may suffice for solar cell application. Many such CCD solar cell elements may be used in a grid. In one application there may be sixteen such solar cells in a strip ½ inch wide and 2 inch long for the device embodiments. Such lower density of pixels on a CCD would considerably reduce their cost making them viable for use as solar cells.

The solar cell embodiment of any of the FIG. 6A, 6B or 6C, either with conventional solar cells or CCD based solar cells, it is believed may provide enough or a bulk of energy needs of the device 10, that it may obviate the need to ever charge the device 10 using conventional electrical wall outlets.

Modes of Use

Figure 7A:
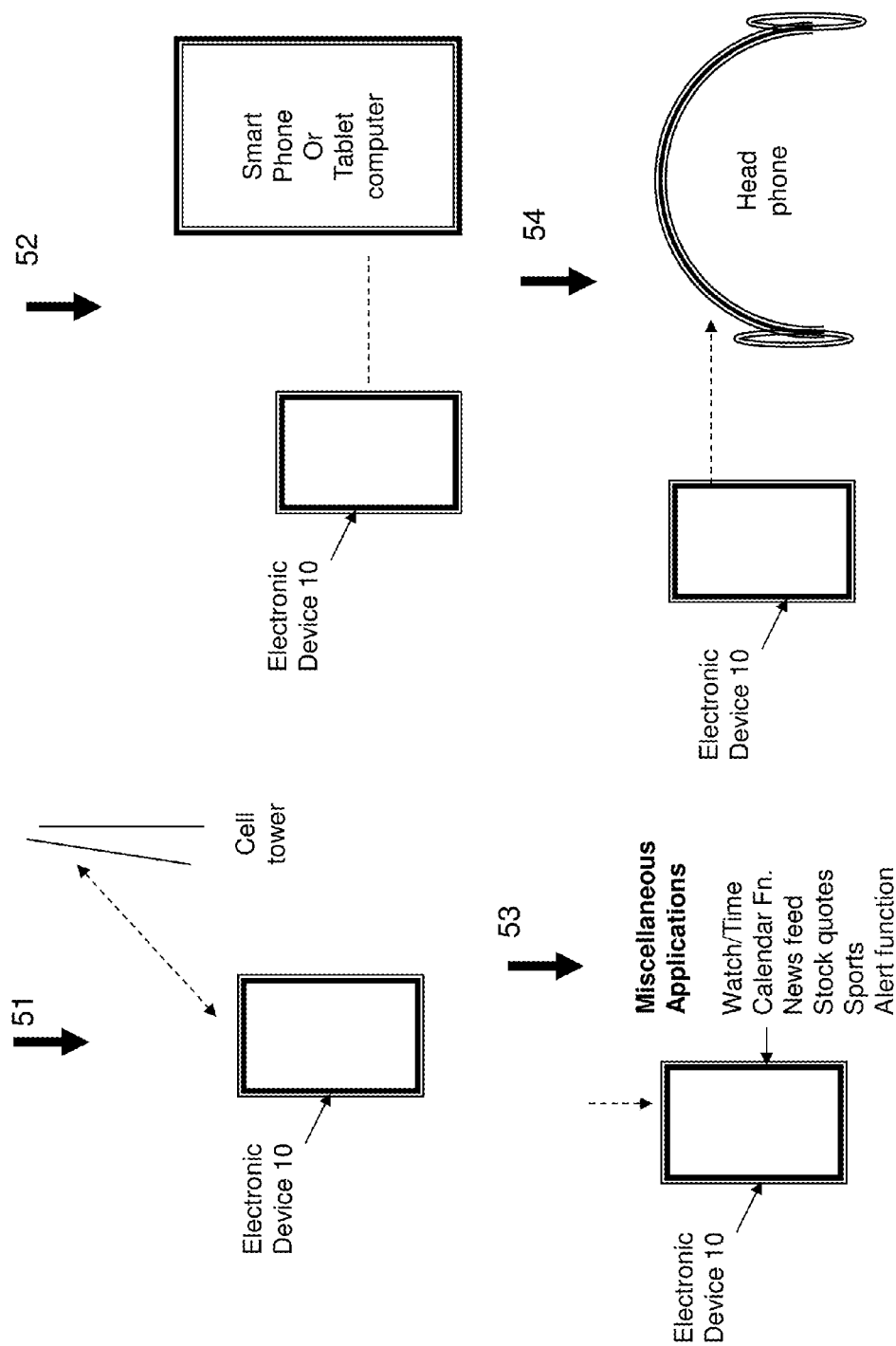
FIGS. 7A-7B are an illustration of different uses and application of the electronic device on the back of human hand.
Figure 7B:
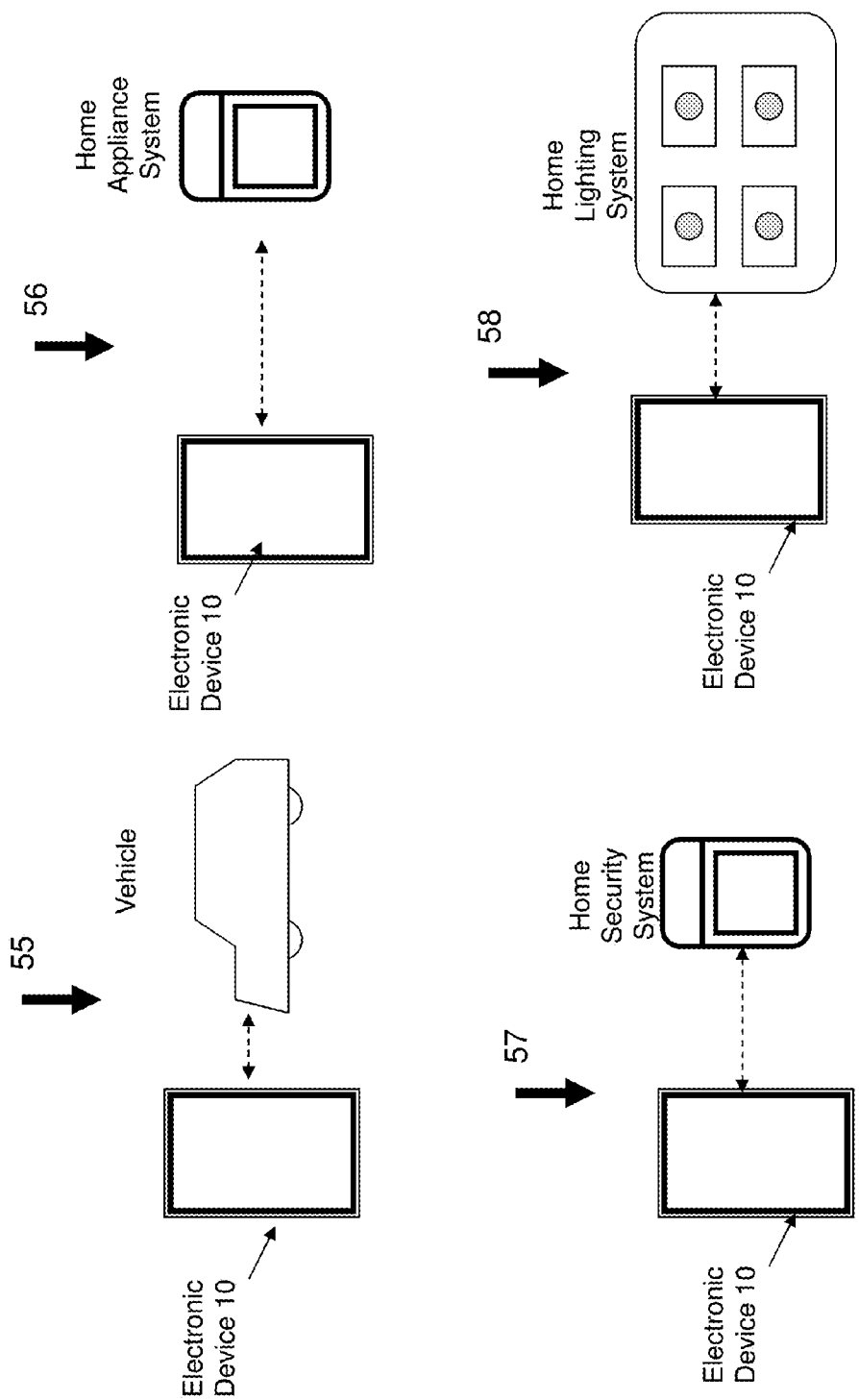

With reference to FIGS. 7A and 7B, different uses or modes of use for device 10 on the back of the hand are illustrated. In view 51, the device 10 may be used as a stand-alone device that communicates with a wireless network using cell towers and may provide all the functions and features of a cell phone or a smart phone.

In view 52, use of the device 10 with a smart phone is illustrated where the device 10 acts as an extension for the smart phone. In view 53, the device 10 may be used as a receive only device to be able to receive and display watch/time and have calendar functions, news feed, sports feed, stock quotes and alert functions.

In view 54, the device 10 may be used to wirelessly interface with a headphone device for sending and receiving command and data. In view 55, the device 10 may interface with a vehicle for sending and/or receiving command and data.

In view 56, the device 10 may be used to wirelessly interface with a home appliance system. In view 57, the device 10 may interface with a home security system for sending and/or receiving command and data. In view 58, the device 10 may interface with home lighting system for sending and receiving commands and data.

With reference to FIG. 8A, the device 10 has functions of antenna 60, GPS 61, Memory 62, CPU 63, short distance wireless 64, cellular wireless 65, touch screen 66, display screen 67, charging socket 68, battery 69, microphone 70, speaker 71, motion sensor 72 and motion energy harvesting mechanism 74.

The motion sensor 72 is interfaced with wrist-flick motion movement detection logic 73 and for using a wrist flick movement for generating control commands 75 for the device 10. The device 10 may also have a pulse rate sensor 77 and a light sensor 78.

The motion energy harvesting mechanism 76 may use a mechanism that is prior art such as generation of kinetic energy by movement of the hand and wrist and powered by an oscillating weight and used in other devices such as self-winding watch movements.

Pulse Rate Sensor 77

The back of the hand does have, like the wrist, blood veins starting from the wrist that run down the back of the hand to the fingers. These veins may be used to measure pulse or heart rate of the wearers. Prior art teaches such pulse rate sensors. Such sensors are being planned for use in wrist watches of other companies such as Apple based on published news. Samsung Gear brand wrist watches use a light sensor based pulse rate sensor. However a different type of pulse rate sensor 77 that may be used with the embodiments herein is illustrated with the help of FIG. 2C.

As illustrated in FIG. 2C, the pulse rate sensor 77 has an airtight air sack 310 that may be positioned at the bottom side of the device 10 so that the air sac 310 is then positioned on the back of the hand and on top of the veins in the back of the hand. The air sac 310 may cover the entire bottom side of the device 10 or may cover a part of the device 10 as long as it is positioned on the veins on the back of the hand. The air sac 310 may be a few millimeters thick and notionally may be 2 to 3 millimeters thick.

The air sac 310 has a curvature 312 in shape that is similar to the curvature of the bottom side of the device 10 and thus the air sac 310 curvature matches the curvature of the back of the hand.

When the air sac 310 is positioned on the top of the veins, it is believed the air sac 310 captures and or magnifies the sound and pressure of pulsing blood flow in the vein, much like a stethoscope. Two sensors 314 and 316 are positioned in the air sac 310 where the sensor 314 measures pressure changes and sensor 316 measures sound variations.

These two sensors collect the pressure and sound measurements and process them in the logic inside the device 10 to calibrate and calculate the pulse rate and blood pressure of the person wearing the device 10. Both or either of the sensors 314 and 316 may be used depending on the calibration and accuracy of the measurements of pulse rate and blood pressure that may be required for fitness applications for which the device 10 may be used. Alternatively different type of pulse sensors provided in prior art such as in Samsung Gear watches may be used.

Therefore, the device 10 also may have a pulse rate sensor positioned on the backside of the device and on the top of the backside of the hand that may be used to measure the pulse rate of the user wearing the device. Such a pulse rate reading device may be integrated with health and fitness programs operating in the device.

FIG. 8B illustrates logic in device 10. These logic functions 80 may include RF electronics function 82, touch display screen 84, motion sensor 86, wrist flick control logic 88, wrist movement energy generation 90, battery 92 and external switches 94. A microphone 96 and speakers 98 may also be used in device 10.

Not all the functions illustrated with the help of FIGS. 8A and 8B may be used or required in each mode of use as has been illustrated with the help of FIGS. 7A and 7B. Therefore, device 10 may be customized for different applications and may be sold at different price points based on the preferences of the buyers of device 10.

Figure 8C:
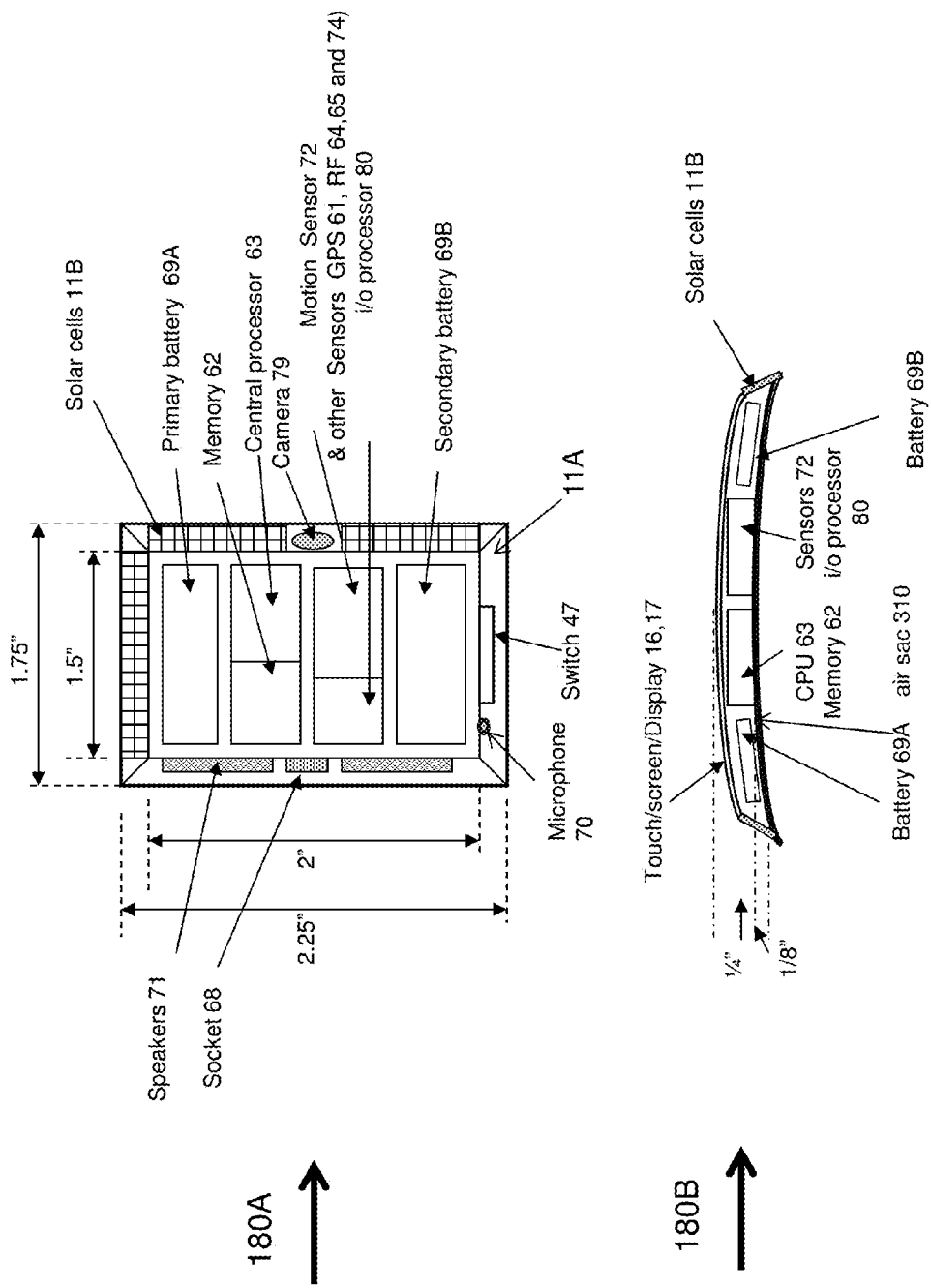
FIG. 8C is simplified illustration of arrangement of components inside the device.

With reference to FIG. 8C a notional layout or arrangement of the components of device 10 inside the contours of the device 10 is illustrated. View 180A shows a simplified illustration of the plan view and view 180B shows a simplified illustration of a side view of the device 10.

As shown in view 180A, notional outer dimensions of the device 10 are 1.75" wide and 2.25" inch high or in length. The size of the display/touch screen is notionally 1.5" wide and 2.00 inch in height, providing for a 2.5" diagonal screen size.

The edges of the device are sloped 11A at notionally at 45 degrees and the sloped space on the four edges of the device is used for mounting solar cells 11B, positioning speakers 71, switch 47, a camera 79 and a microphone 70. The device may have two batteries 69A and 69B that may be used as primary and secondary batteries, while one is being charged with the help of the solar cells, other may be actively used. The size of each of these batteries may be $1.5"\times0.5"\times\frac{1}{8}"$. Each of which may be rated at 200 to 300 mAH, proving for a total battery capacity of 400 to 600 mAH.

The device has a notional space of $0.5"\times0.5"\times\frac{1}{8}"$ for central processor 63 and a notional space of $1.0"\times0.5"\times\frac{1}{8}"$ for the memory module 62. The memory size notionally may be 1.00 to 4 GB.

The device has a notional space of $0.5"\times0.5"\times\frac{1}{8}"$ for the I/O processor 80 and $0.5"\times0.5"\times\frac{1}{8}"$ for the sensors including the motion sensor 72 including a gyro sensor 72 and $0.5"\times0.5"\times\frac{1}{8}"$ also for the short distance radio frequency electronics 64 and cellular frequency electronics 65. The RF antenna 60 (not shown) may be positioned near the contours of the device inside the device.

As illustrated in view 180B, in a side view of the device 10, the display/touch screen 17 is curved and notionally may be of thickness of $\frac{1}{16}^{th}$ inch. The air sac 310 padding positioned at the bottom of the device 10 may also be notionally $\frac{1}{16}"$ in thickness. As has been illustrated earlier with the help of FIG. 2C and FIG. 5, the device is notionally $\frac{1}{4}$ inch thick 13A and has a curvature 11 that matches the back of the hand curvature and provides for a curve of depth of $\frac{1}{8}"$ from the center of the device.

The device 10 and wear-mechanism 12 with their various embodiments would work well with a wireless collar device that has been described in a pending patent application Ser. No. 13/374,196, filed Dec. 15, 2011 of the inventor. This wireless collar device teaches a voice-interface and uses directional speakers and does not have a display screen. The screen of device 10 here may serve as a screen for this wireless collar device, thus providing a degree of freedom in interfacing and interacting with the inter-connected world around us.

User Interface

The user interface to the functions and modes of the electronic device 10 may be performed in different ways that include touch input selections on the touch screen, mechanical switches, and wrist and hand movements as has been described earlier.

It is to be understood that the size of the display/touch screen of the device 10 is, unlike smart phones and similar devices, very limited in size. Further, the device 10 is not held in the hand but mounted on the back of the hand. Hence the touch screen control interface as had been used in the prior art devices such as smart phones and the like may not be convenient for some users for use with device 10.

An alternative form of touch screen interface control that had been described in a pending U.S. application Ser. No. 12/456,009, file date Jun. 10, 2009 of the inventor may be advantageously used with the embodiments of the device 10 here.

From the abstract of this application, this disclosure teaches a system of touch screen user interface in a touch screen equipped handheld electronic device has a bounded control area on a touch screen that is used for touch control in lieu of the entire touch screen surface. The control area is able to provide touch control user interface functions of scroll, zoom, action item selection, and other control functions. The control area may be minimized enabling the entire touch screen to resume its touch screen control function in lieu of the control area control and maximized enabling only the bounded control area to be used for touch screen control depending upon a user's preference. The bounded control area for selection control functions may be used in conjunction with unique type of hop-cursors, for different types of displays that change automatically when the display content changes.

Methods of Operation

With reference to FIG. 11, method is illustrated where all the steps may not be used or used in the order specified:

At step 100, using a space on a back-side of a human hand, between the wrist joint and the finger joints, the space referred to as opisthenar, mounting or wearing thereon a wear mechanism for an electronic device;

At step 102, providing in the device, functions of (i) receive/transmit RF electronics, (ii) a touch/display screen, (iii) a battery, and (iv) external switches; and At step 104, providing in the device logic functions that for using the device as an extension device for a smart phone.

At step 106, providing a motion sensor, coupling the sensor with a logic that provides wrist-hand flick activated device on/off control and mode control functions.

At step 108, providing a wrist-hand movement motion generated electric energy generation mechanism.

At step 110, having a loop around a wrist joint and attached to a portion of the loop, first ends of a pair of linear members terminating in a half loop hook on the second ends, the hooks support the linear members in the joint between fingers;

At step 112, having a pair of cross members positioned across the linear members and attached to the linear members, the members providing a support and mounting mechanism for positioning an electronic device;

At step 114, using the wear mechanism used for mounting the electronic device with the device detachably attached to the cross members.

At step 116, the wear mechanism positioned on opisthenar clear of the wrist joint and its motion and also clear of the finger joints and their motions;

At step 118, enabling a mechanism for mounting an electronic device on the back of the hand, the device is positioned away from the wrist joint and finger joints and their movements.

Control of Device 10

The device 10 may be controlled in different ways. One of these ways is having mechanical or touch switches 47 positioned on the device body itself, as in FIG. 4. Another way is to use a jerky motion of the hand itself. FIG. 9A illustrates some of these wrist based motion controls.

There may be two different jerk motions. One jerk motion would rapidly rotate the wrist either to the left 98A or right 98B. Another jerk motion would be to rapidly tilt or jerk the wrist at the wrist joint up 99A and down 99B. A combination of these control means may be used. The control may include device on/off, flip the solar panel open/close and mode control such as pick up/hang up in a communication mode. A motion sensor in the device is programmed to detect these types of jerky wrist movements that would be indicative of a control command to the device.

Figure 9B:
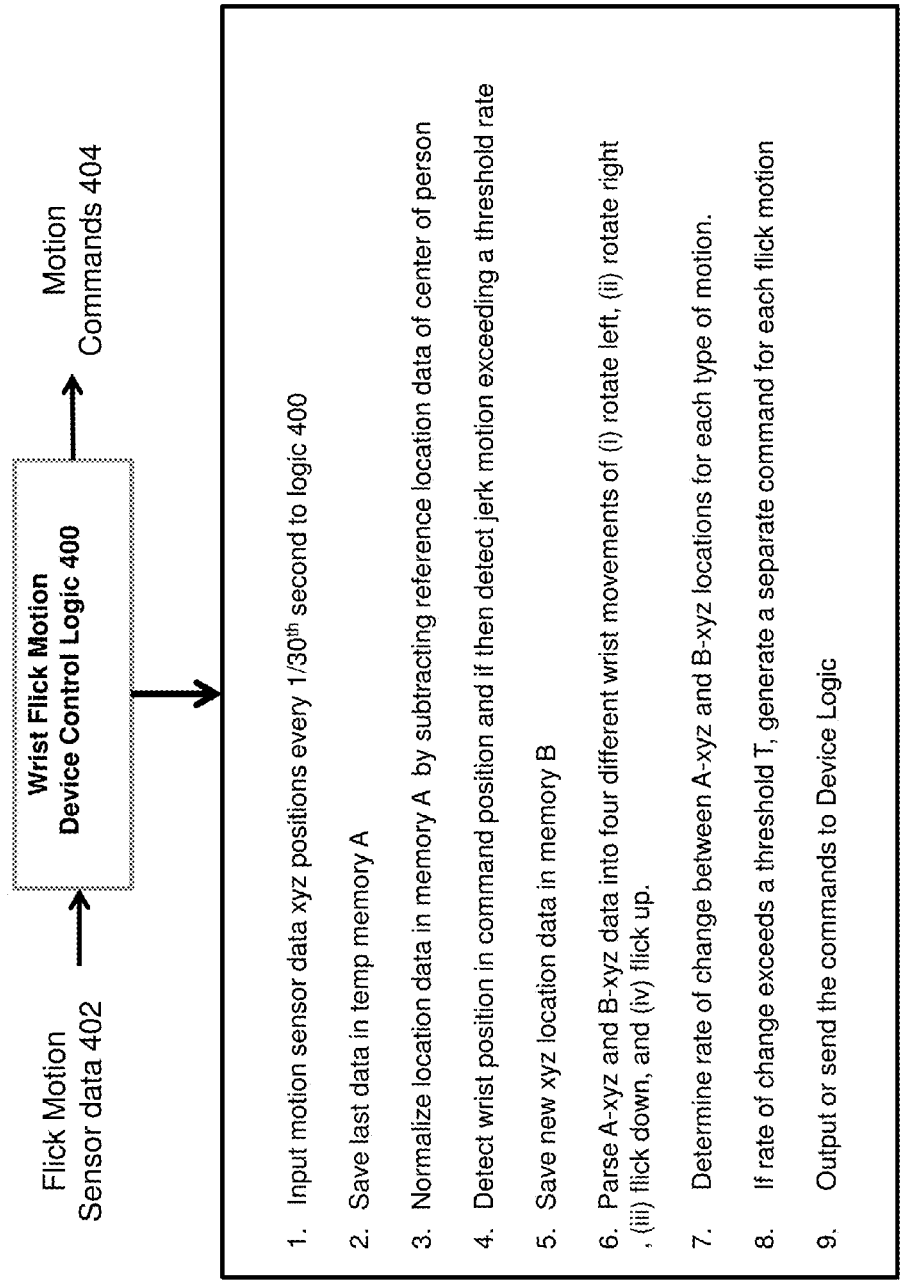
FIG. 9B is a simplified illustration of wrist flick motion control logic for the device.

FIG. 9B illustrates an embodiment of the wrist flick control logic. Logic 400 has input 402 of motion sensor and outputs commands 404 to the device logic. The logic 300 has the sub-functions of:

1. Input motion sensor data xyz positions every $\frac{1}{30}^{th}$ second to logic 400.
2. Save last data in temp memory A.
3. Normalize location data in memory A by subtracting reference location data of center of person.
4. Detect wrist position in command position and if then detect jerk motion exceeding a threshold rate.
5. Save new xyz location data in memory B.
6. Parse A-xyz and B-xyz data into four different wrist movements of (i) rotate left, (ii) rotate right, (iii) flick down, and (iv) flick up.
7. Determine rate of change between A-xyz and B-xyz locations for each type of motion.
8. If rate of change exceeds a threshold T, generate a separate command for each flick motion.
9. Output or send the commands to Device Logic.

Applications of Device 10

The device 10 is worn on the back of the hand and this feature of the device makes possible many new applications of the device 10. Some of these applications include swing analysis of the hand that is holding and or performing different type of sport activities.

Figure 12A:
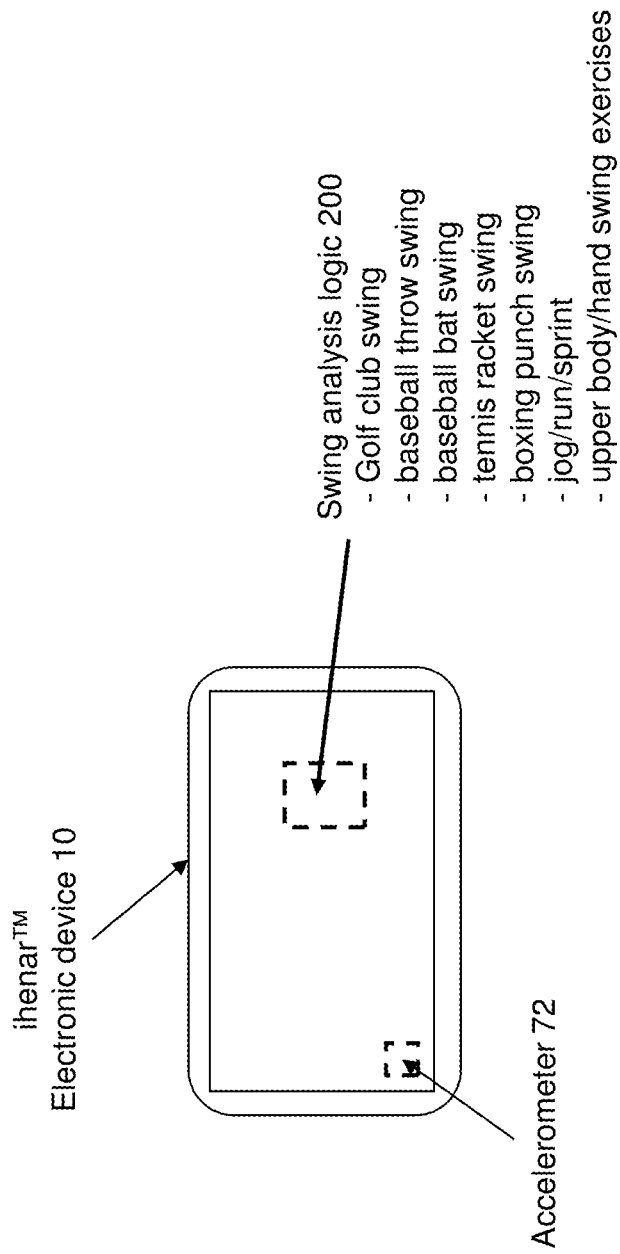
FIGS. 12A-12B are simplified illustrations of an application embodiment of device for swing analysis.
Figure 12B:
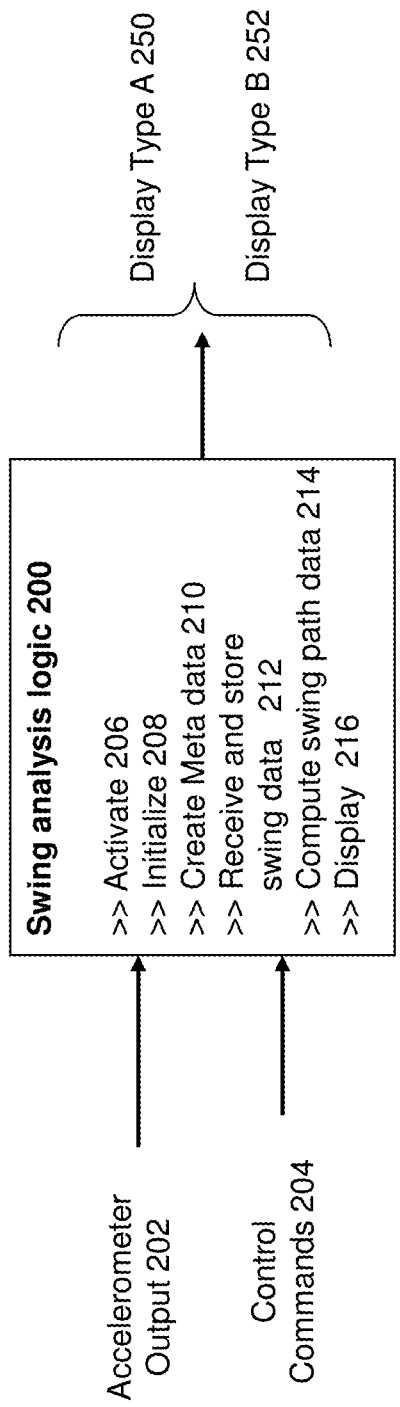

FIGS. 12A and 12B teach use of device 10 for swing analysis. FIG. 12A shows device 10 with a gyro sensor, accelerometer or motion sensor 72 and swing analysis logic 200. The swing analysis logic 200 may be customized and used for applications such as: Golf club swing, baseball throw swing, baseball bat swing, tennis racket swing, boxing punch swing, jog/run/sprint, and upper body/hand swing exercises. For some of these sport activities the device 10 is water-proof and shock proof.

FIG. 12B illustrates the basic features and functions of the swing analysis logic 200. These include output of gyro, or motion sensor 72 being input 202 to the logic 200, and control commands 204 being input to logic 200. The swing analysis functions 200 may include activate 206, initialize 208, create Meta data 210, receive and store swing data 212, compute swing path data 214 and display 216. There may be different types of display depending on the activity such as display type A 250 and display type B 252, as are illustrated later with the help of FIGS. 14A and 14B for a golf club swing.

Figure 13A:
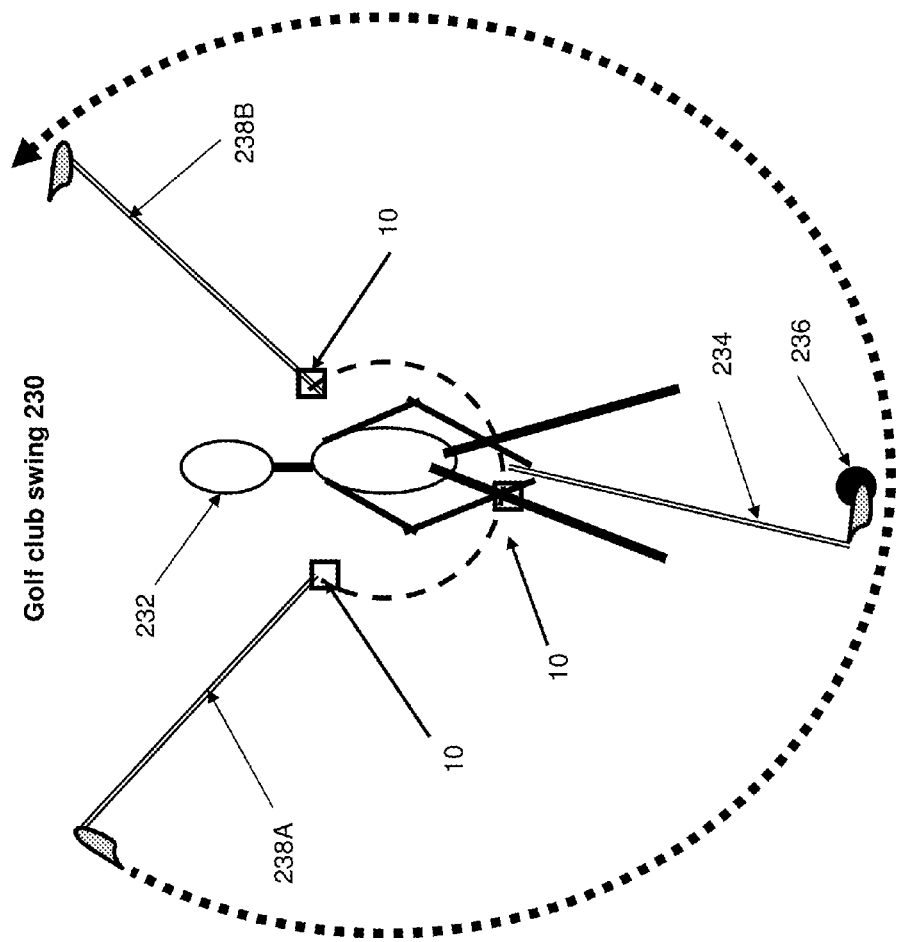

FIGS. 13A and 13B show simplified illustrations for the activity of analyzing golf club swing 230. FIG. 13A illustrates that a person 232 is wearing on the back of the hand the device 10 and is holding a golf club 234 for hitting a ball 236 and the golf club has beginning club position 238A and end club position 238B. The device 10 position as the club is swung is also shown in three different locations of the swing arc.

FIG. 13B illustrates the functions operative in the swing logic. The device is initialized 208 to record a set of swing data. Sensor data output 202 detects a swing begin and swing end positions and the data collected in between these two events or positions. Each end position is marked or distinguished based on a pause or stationary condition of the device 10.

Figure 14A:
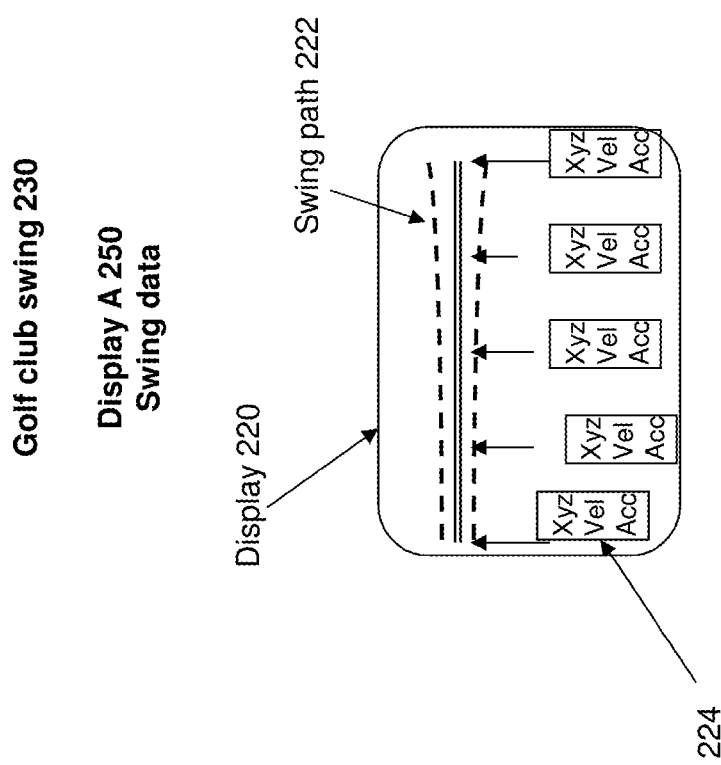

With reference to FIG. 14A, the swing logic 200 has functions of create Meta data with the parameters of date, time, club id, swing sequence id and swing id. The data is collected and stored and then used to compute swing data periodically such as every $20^{th}$ of a second. The data is then displayed on the screen of device itself or a large screen computing device such as tablet computer or a smart phone.

Figure 14B:
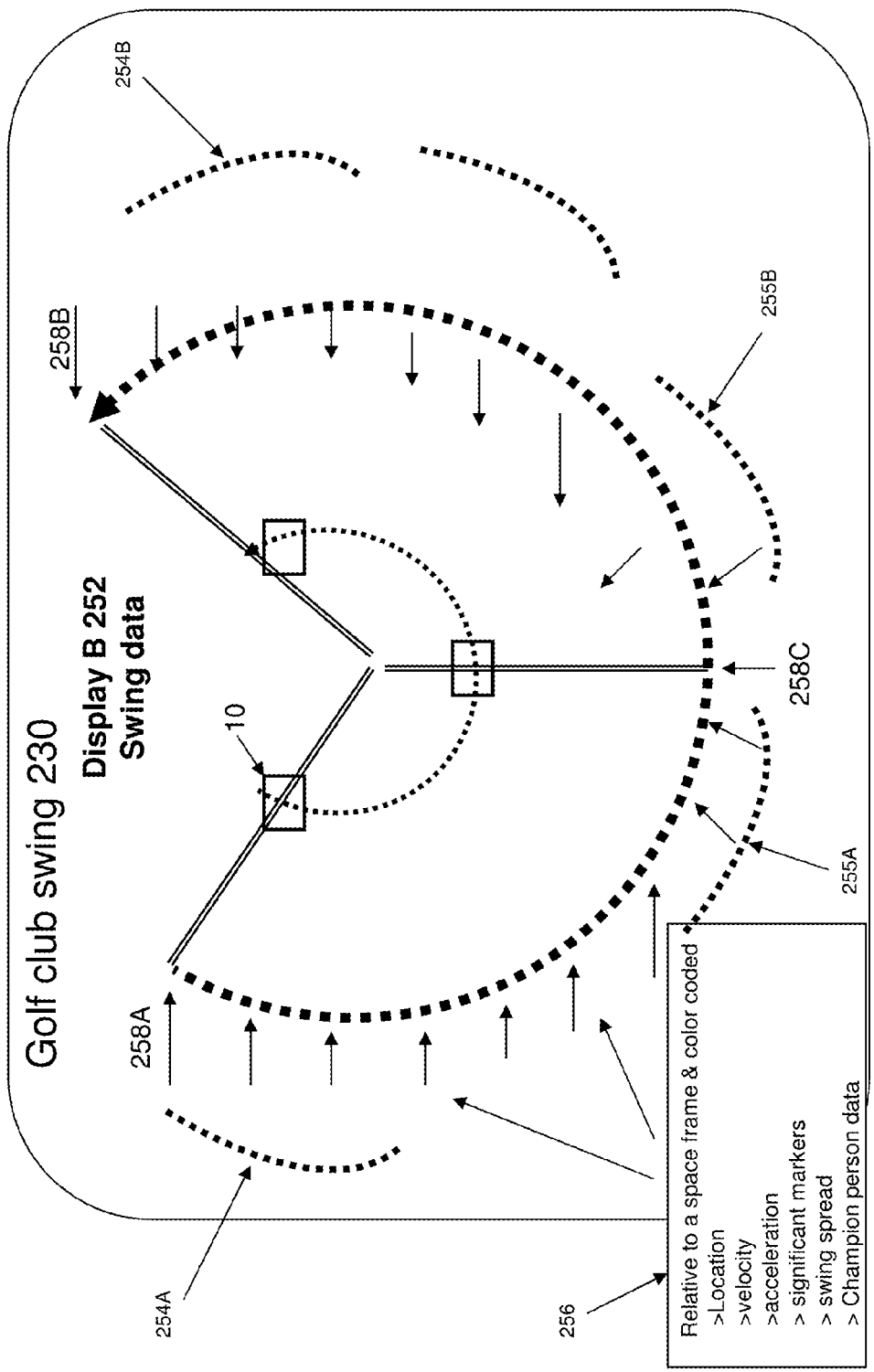

The two different types of display for golf swing are illustrated with the help of FIGS. 14A and 14B. FIG. 14A provides a display type A 250 that shows a plan view of the swing and this display captures swing path 222 and swing data 224. FIG. 14B provides for a display type B 252 which shows the side view of the swing data. The display B shows data 256 that is relative to a space frame and is color coded, and may be compared with the swing data of others.

Different parts of the swing data such as begin swing 258A and end swing 258B and hitting the ball 258C and their corresponding profile data 254A and 254B, as well as just before hitting the ball 255A and just after hitting the ball 255B may be illustrated.

Figure 15A:
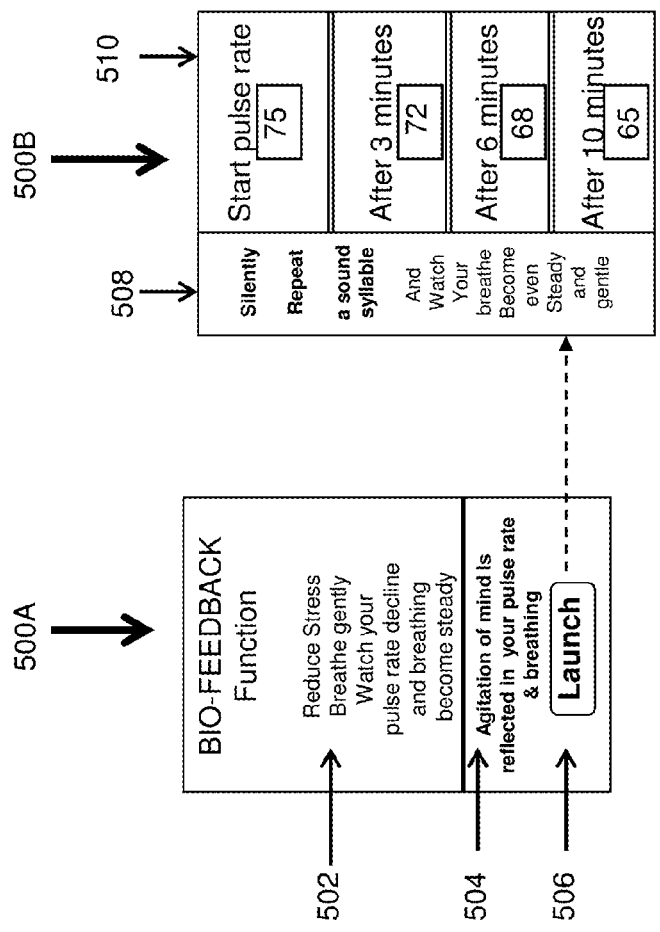
FIG. 15A is a simplified illustration of an application for bio-feedback.

Another application of the device 10 and wear-harness 12 for a biofeedback function 500 is illustrated with the help of FIGS. 15A and 15B. Biofeedback is an important psychological and biological function and may be used to reduce daily stress with the help of the biofeedback application 500.

As illustrated in FIG. 15A, the feedback function 500 provides for a screen display 500A, that illustrates the benefits of bio-feedback 502, principal of biofeedback 504, and has an ability to launch the function with a launch button 506. When the biofeedback application is launched screen 500B is displayed. The screen 500B displays biofeedback instructions 508 on a part of the screen and displays current pulse rate and pulse rate at different time intervals on another part of the screen 510. These time intervals may be in minutes such as notionally 3, 6 and 10 minutes.

The instructions of screen 500B instruct the user to silently repeat a sound syllable and watch their breath become even and gentle. It is a well known physiological aspect of the human body that the agitation of the mind is reflected in the unevenness of the breath and the pulse rate. It is also well known that an even breathing pattern calms the mind.

As illustrated in FIG. 15B, the functions and steps of the bio-feedback function 500 are:
1. Launch Biofeedback app
2. Display Biofeedback screen 500A
3. Detect Launch activation
4. Display Screen 500B
5. Display current pulse rate
6. Begin Time Counter
7. Display pulse rate at different times
8. Store pulse rate data for different attempts
9. Chime note when desired pulse rate reached
10. Display elapsed time
11. Display comparison with previous elapsed times Steps 7 to 10 provide the ability for the user to improve over time and train their mind to achieve a state of calm or reduced stress over time earlier or faster.

An electronic device for positioning on a back-side of a human hand on a space on the back-side of hand, the space called opisthenar, has a top side and a bottom side, the top side of the device has a display screen, the display screen size is equal to or more than one square inch in area and equal to or less than nine square inches in area, the bottom side is suitable for being positioned on the space on the back-side of the human hand. A wear-mechanism that secures the electronic device to the back-side of the hand, in a fashion that does not impede free movement of the fingers relative to the palm and the free movement of the hand relative to the wrist. An attach mechanism on the bottom side of the device that attaches the device to the wear-mechanism that is positioned on the back-side of the hand.

The wear-mechanism has a top side and a bottom side and is worn on the human hand with the top side on the back-side of the hand and the bottom side on a part of the front-side of the hand and the wear-mechanism when worn on the hand does not obstruct free use of the hand. The top-side of the wear-mechanism has an attach/detach mechanism for attaching/detaching the device to the wear-mechanism. The wear-mechanism includes at least a loop-attacher that encircles the wrist and two loop-attachers that encircle two of the fingers and secures the wear-mechanism to the back-side of the hand.

The screen size of the device is selected from a group of (i) 2.5" by 1.75", (ii) 2.5" by 1.5", (iii) 2.5" by 1.25", (iv) 2.25" by 1.5", (v) 2" by 1.25", (vi) 1.75" by 1.5", (vii) 1.5" by 1.5", (viii) 1.5" by 1.25", (ix) 1.5" by 1.0", or (x) 1.25" by 1.25", for positioning on different size hands.

The bottom side of the device is curved with a curvature that matches the curvature of the back-side of the hand and optionally, the display screen on the front side of the device is also curved with a curvature that matches the curvature of the bottom side of the device.

The device has a motion sensor to detect a plurality of movements of the hand and the wrist and use these detected movements to control the operation of the device.

The device has an energy generation mechanism that includes one or more of solar cells and kinetic energy that is generated by oscillation of a weight by movement of wrist and hand. The backside of the device has a pulse rate sensor for measuring pulse rate.

The sides of the device are sloped out with a slope of substantially 45 to 60 degrees, enabling a substantial part of the sides to be used for positioning solar cells and positioning the substantial part of the sides with solar cell elements and positioning, in addition, on the sides of the device, selected one or more from a group of, speakers, switches, microphone, sockets and cameras.

The electronic device has a CPU and a memory and has (i) a touch/display screen, (ii) receive/transmit RF electronics, (iii) a battery, and (iv) external switches.

A logic in the device provides for use of the device as an extension device for use with a mobile wireless communication device and/or as a stand-alone device able to communicate with other devices in the surroundings, including cell towers, wireless network, other short RF equipped devices in a home and an automobile.

A hand wearable electronic device for wearing on a back side of a human hand, and for use as an extension device to a wireless communication device of a user has a wear-mechanism for the electronic device that is worn on the space on the back-side of a human hand, the space on the back-side of the human hand referred to as opisthenar and identified as a space between a wrist joint and finger joints. The wear mechanism positions the device on a part of the space on the back-side of the human hand that is clear of the wrist joint so as not obstruct free movement of the hand at the wrist joint. The electronic device has a CPU and a memory and has (i) a touch/display screen, (ii) receive/transmit RF electronics, (iii) a battery, and (iv) external switches. A logic in the device provides for use of the device as an extension device for use with the mobile wireless communication device or as a stand-alone device.

The device has a motion sensor coupled with a motion sensor logic that provides wrist-hand movement activated control of the device to include on/off control and mode control functions.

The device has a plurality of solar cells that are (i) positioned on a substantial part of the sides of the device or edges of the device or (ii) arranged across on a surface that is extending away from an edge side of the device for use as an electric energy generation mechanism for charging a battery of the device. The device has a wrist-hand movement motion generated electric energy generation mechanism in the device for charging a battery of the device.

The device has a loop around a wrist joint and attached to a portion of the loop, first ends of a pair of linear members and the linear members, on the second ends, opposite the first ends, terminating in half loops, the half loop hook in the joint between fingers to position and support the linear members on the back-side of the hand. A pair of cross members positioned across the linear members and attached to the linear members, the cross members provide a support and mounting mechanism for mounting and positioning the electronic device thereon, wherein the wear-mechanism is used for mounting the electronic device with the device detachably attached to the cross members.

The wear-mechanism has is positioned on opisthenar clear of the wrist joint and its motion and also clear of the finger joints and their motions. A mount mechanism enabling mounting the device thereon, the mount mechanism similarly positioned away from the wrist joint and finger joints and their movements.

The wear-mechanism has a glove-like wear-article that is worn on a part of the hand that includes at least a part of the backside of the hand and excludes the palm of the hand. The glove-like article has an attachment means to detachably attach the electronic device.

The wear mechanism has a glove like wear-article that is worn on a part of the hand that includes at least a part of the backside of the hand and excludes the palm of the hand. The glove like wear-article that is worn on a part of the hand that includes at least the backside of the hand, a length of fingers until before the knuckles and excludes the palm of the hand. The glove has an attachment means to be detachably attach the electronic device.

The sides of the device are sloped out with a slope of substantially 45 to 60 degrees, enabling a substantial part of the sides to be used for positioning solar cells and positioning the substantial part of the sides with solar cell elements and positioning, in addition, on the sides of the device, speakers, switches, microphone, sockets and cameras.

A method for a hand wearable electronic device for wearing on a space on a back-side of a human hand, comprising the steps, where all the steps may not be used or used in the order specified of:

a. providing an electronic device that includes a wireless receive and transmit electronic mechanism for wearing on the space on the back-side of the human hand, between the wrist joint and the finger joints, the space referred to as opisthenar.

b. securing the device to the back of the hand with a wear mechanism and wearing the wear mechanism on the back-side of the hand.

c. shaping and sizing the device for positioning on the back-side of the human hand with the help of the wear-mechanism that secures the electronic device to the back of the hand in a fashion that does not impede free movement of the fingers relative to the palm and the free movement of the hand relative to the wrist.

d. the bottom side of the device has an attach/detach mechanism for attaching/detaching the device a the wear-mechanism that is positioned on the back-side of the hand.

e. providing in the device functions of (i) receive/transmit RF electronics, (ii) a touch/display screen, (iii) a battery, and (iv) external switches.

f. providing in the device logic functions for using the device as an extension device for use with a mobile wireless communication device and/or as a stand-alone device able to communicate with other devices in the surroundings, including cell towers, wireless network, other short RF equipped devices in the home and automobile.

g. providing a motion sensor, coupling the sensor with a logic that provides wrist-hand flick activated device on/off control and mode control functions.

h. the wear-mechanism includes at least a loop-attacher that encircles the wrist and two loop-attachers that encircle two fingers and secures the electronic device to the hand of the person with the electronic device positioned adjacent to and over the back of the hand.

In summary, the embodiments herein relate to improvements in hand wearable devices that are worn on the back of the hand that may be used as an extension of a smart phone and making such devices easier to use with a more user friendly interface.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. An electronic device for positioning on a back-side of a human hand on a space on the back-side of hand, the space called opisthenar, wherein the space is bounded on one side by the wrist joint and on the other side by finger joints, comprising:

the electronic device has a proximal edge and a distal edge, wherein the device is configured to be positioned on the back-side of the human hand, with the proximal edge at least a first distance away from the wrist joint that does not obstruct free movement of the wrist joint, and the distal end at least a second distance away from the finger joints that does not obstruct free movement of the finger joints;

the device has a top side and a bottom side, the top side of the device has a display screen, and wherein the bottom side of the device is curved with a curvature that substantially matches a transverse curvature of the back-side of the human hand for being positioned on the space on the back-side of the human hand;

the bottom side of the device has positioned thereon a removable substrate, wherein the removable substrate is for protecting veins on the back of the hand from a weight of the device; and the bottom side of the device has an attachment mechanism that affixes to a wear-mechanism, wherein the wear mechanism secures the electronic device to the back-side of the hand.

2. The device as in claim 1, the wear mechanism comprising:

a. the wear-mechanism has a top side and a bottom side and is worn on the human hand with the top side on the back-side of the hand and the bottom side on a part of the front-side of the hand and the wear-mechanism when worn on the hand does not obstruct free use of the hand;

b. the top-side of the wear-mechanism has an attach/detach mechanism for attaching/detaching the device to the wear-mechanism;

c. the wear-mechanism includes at least a loop-attacher that encircles the wrist and two loop-attachers that encircle two of the fingers and secures the wear-mechanism to the back-side of the hand.

3. The device as in claim 1, comprising:

the screen size of the device is selected from a group of (i) 2.5" by 1.75", (ii) 2.5" by 1.5", (iii) 2.5" by 1.25", (iv) 2.25" by 1.5", (v) 2" by 1.25", (vi) 1.75" by 1.5", (vii) 1.5" by 1.5", (viii) 1.5" by 1.25", (ix) 1.5" by 1.0", or (x) 1.25" by 1.25", for positioning on different size hands.

4. The device as in claim 1, comprising:

the bottom side of the device is curved with a curvature that matches the curvature of the back-side of the hand; and optionally, the display screen on the front side of the device is also curved with a curvature that matches the curvature of the bottom side of the device.

5. The device as in claim 1, comprising:

the device has a motion sensor to detect a plurality of movements of the hand and the wrist and use these detected movements to control the operation of the device.

6. The device as in claim 1, comprising:
the device has an energy generation mechanism that includes one or more of solar cells and kinetic energy that is generated by oscillation of a weight by movement of wrist and hand.

7. The device as in claim 1, comprising:
the backside of the device has a pulse rate sensor for measuring pulse rate.

8. The device as in claim 1, comprising:
a. the sides of the device are sloped out with a slope of substantially 45 to 60 degrees, enabling a substantial part of the sides to be used for positioning solar cells and positioning the substantial part of the sides with solar cell elements;
b. positioning, in addition, on the sides of the device, selected one or more from a group of, speakers, switches, microphone, sockets and cameras.

9. The device as in claim 1, comprising:
the electronic device has a CPU and a memory and has (i) a touch/display screen, (ii) receive/transmit RF electronics, (iii) a battery, and (iv) external switches.

10. The device as in claim 1, comprising:
a. a logic in the device provides for use of the device as an extension device for use with a mobile wireless communication device;
b. and/or as a stand-alone device able to communicate with other devices in the surroundings, including cell towers, wireless network, other short RF equipped devices in a home and an automobile.

11. A hand wearable electronic device for wearing on a back side of a human hand, in the space called opisthenar bounded on one side by the wrist joint and on the other side by finger joints and for use as an extension device to a wireless communication device of a user, comprising:
the electronic device has a proximal edge and a distal edge, wherein the device is configured to be positioned on the back-side of the human hand, with the proximal edge at least a first distance away from the wrist joint that does not obstruct free movement of the wrist joint, and the distal end at least a second distance away from the finger joints that does not obstruct free movement of the finger joints;
a wear-mechanism, wherein the wear mechanism positions the electronic device on a part of the space on the back-side of the human hand, wherein the part of the space of the back hand is selected that is clear of the wrist joint by substantially half an inch so as not obstruct free movement of the hand at the wrist joint;
the electronic device has a CPU and a memory and has (i) a touch/display screen, (ii) receive/transmit RF electronics, (iii) a battery, and (iv) external switches; and
a logic in the device provides for use of the device as an extension device for use with the mobile wireless communication device or as a stand-alone device.

12. The device as in claim 11, further, comprising:
a motion sensor coupled with a motion sensor logic that provides wrist-hand movement activated control of the device to include on/off control and mode control functions.

13. The device as in claim 11, further, comprising:
a plurality of solar cells are (i) positioned on a substantial part of the sides of the device or edges of the device or (ii) arranged across on a surface that is extending away from an edge side of the device for use as an electric energy generation mechanism for charging a battery of the device.

14. The device as in claim 11, further, comprising:
the device has a wrist-hand movement motion generated electric energy generation mechanism in the device for charging a battery of the device.

15. The device as in claim 11, the wear mechanism, comprising:
a. a loop around a wrist joint and attached to a portion of the loop, first ends of a pair of linear members and the linear members, on the second ends, opposite the first ends, terminating in half loops, the half loop hook in the joint between fingers to position and support the linear members on the back-side of the hand;
b. a pair of cross members positioned across the linear members and attached to the linear members, the cross members provide a support and mounting mechanism for mounting and positioning the electronic device thereon, wherein the wear-mechanism is used for mounting the electronic device with the device detachably attached to the cross members.

16. The device as in claim 11, the wear-mechanism, comprising:
a. the wear mechanism positioned on opisthenar clear of the wrist joint and its motion and also clear of the finger joints and their motions;
b. a mount mechanism enabling mounting the device thereon, the mount mechanism similarly positioned away from the wrist joint and finger joints and their movements.

17. The device as in claim 11, the wear-mechanism, comprising:
a. a glove-like wear-article that is worn on a part of the hand that includes at least a part of the backside of the hand and excludes the palm of the hand;
b. the glove-like article has an attachment means to detachably attach the electronic device.

18. The device as in claim 11, the wear mechanism, comprising:
a. a glove like wear-article that is worn on a part of the hand that includes at least a part of the backside of the hand and excludes the palm of the hand;
b. the glove like wear-article that is worn on a part of the hand that includes at least the backside of the hand, a length of fingers until before the knuckles and excludes the palm of the hand;
c. the glove has an attachment means to be detachably attach the electronic device.

19. The device as in claim 11, comprising:
a. the sides of the device are sloped out with a slope of substantially 45 to 60 degrees, enabling a substantial part of the sides to be used for positioning solar cells and positioning the substantial part of the sides with solar cell elements;
b. positioning, in addition, on the sides of the device, speakers, switches, microphone, sockets and cameras.

20. A method for an electronic device for positioning on a back-side of a human hand on a space on the back-side of hand, the space called opisthenar, wherein the space is bounded on one side by the wrist joint and on the other side by finger joints, comprising the steps of:
providing the electronic device with a proximal edge and a distal edge, wherein the device is configured to be positioned on the back-side of the human hand, with the proximal edge at least a first distance away from the wrist joint that does not obstruct free movement of the wrist joint, and the distal end at least a second distance away from the finger joints that does not obstruct free movement of the finger joints;

providing the electronic device that has a top side and a bottom side, and a display screen on the top side;

providing the bottom side of the electronic device with a curvature that substantially matches a transverse curvature of the back-side of the human hand for being positioned on the space on the back-side of the human hand;

positioning on the bottom side of the device a removable substrate, wherein the removable substrate is for protecting veins on the back of the hand from a weight of the device; and providing the bottom side of the device with an attachment mechanism that affixes to a wear-mechanism, wherein the wear mechanism secures the electronic device to the back-side of the hand.

21. The method for the electronic device as in claim 20, further comprising the steps of:

providing the device with a motion sensor to detect a plurality of movements of the hand and the wrist and use these detected movements to control the operation of the device.

22. The method for the electronic device as in claim 20, further comprising the steps of:

providing the device with an energy generation mechanism that includes one or more of solar cells and kinetic energy that is generated by oscillation of a weight by movement of wrist and hand.

23. The method for the electronic device as in claim 20, further comprising the steps of:

providing the sides of the device sloped out with a slope of substantially 45 to 60 degrees, enabling a substantial part of the sides to be used for positioning solar cells and positioning the substantial part of the sides with solar cell elements;

positioning, in addition, on the sides of the device, selected one or more from a group of, speakers, switches, microphone, sockets and cameras.

24. The method for the electronic device as in claim 20, further comprising the steps of:

providing the electronic device with a CPU and a memory and with (i) a touch/display screen, (ii) receive/transmit RF electronics, (iii) a battery, and (iv) external switches.

* * * * *